(12) United States Patent
Bridges et al.

(10) Patent No.: US 10,906,423 B2
(45) Date of Patent: Feb. 2, 2021

(54) POWER AGGREGATION SYSTEM FOR DISTRIBUTED ELECTRIC RESOURCES

(71) Applicant: V2Green, Inc., Reston, VA (US)

(72) Inventors: Seth W. Bridges, Seattle, WA (US); Seth B. Pollack, Seattle, WA (US); David L. Kaplan, Seattle, WA (US)

(73) Assignee: V2Green, Inc., Reston, VA (US)

( * ) Notice: Subject to any disclaimer, the term of this patent is extended or adjusted under 35 U.S.C. 154(b) by 0 days.

(21) Appl. No.: 16/364,317

(22) Filed: Mar. 26, 2019

(65) Prior Publication Data

US 2020/0055418 A1 Feb. 20, 2020

Related U.S. Application Data

(63) Continuation of application No. 15/234,843, filed on Aug. 11, 2016, now Pat. No. 10,279,698, which is a
(Continued)

(51) Int. Cl.
*B60L 53/63* (2019.01)
*G06Q 50/06* (2012.01)
(Continued)

(52) U.S. Cl.
CPC .............. *B60L 53/63* (2019.02); *B60L 53/00* (2019.02); *B60L 53/51* (2019.02); *B60L 53/52* (2019.02); *B60L 53/64* (2019.02); *B60L 55/00* (2019.02); *G05B 13/026* (2013.01); *G06Q 30/0202* (2013.01); *G06Q 50/06* (2013.01); *H02J 3/008* (2013.01); *H02J 3/38* (2013.01); *H02J 7/007* (2013.01); *H02J 7/0021* (2013.01); *H02J 7/04* (2013.01); *H02J 7/34* (2013.01); *H02J 13/0082* (2013.01); *B60L 2240/80* (2013.01); *H02J 3/32* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 10/14* (2013.01); *Y04S 10/50* (2013.01); *Y04S 30/14* (2013.01); *Y04S 40/121* (2013.01); *Y04S 50/10* (2013.01); *Y04S 50/14* (2013.01); *Y04S 50/16* (2018.05)

(58) Field of Classification Search
CPC .............. B60L 11/1816; B60L 11/1818; B60L 11/1824; B60L 2210/30; Y02T 10/7005; Y02E 40/72
USPC ......................................................... 320/107
See application file for complete search history.

(56) References Cited

U.S. PATENT DOCUMENTS 5,548,200 A * 8/1996 Nor ..................... H02J 7/0027
320/109
6,664,653 B1 * 12/2003 Edelman .................. H02J 3/38
290/46
(Continued)

*Primary Examiner* — Christopher P McAndrew
(74) *Attorney, Agent, or Firm* — Bookoff McAndrews, PLLC

(57) ABSTRACT

Systems and methods are described for a power aggregation system. In one implementation, a method includes establishing a communication connection with each of multiple electric resources connected to a power grid, receiving an energy generation signal from a power grid operator, and controlling a number of the electric resources being charged by the power grid as a function of the energy generation signal.

20 Claims, 25 Drawing Sheets

Related U.S. Application Data continuation of application No. 14/462,117, filed on Aug. 18, 2014, now Pat. No. 9,436,948, which is a continuation of application No. 12/427,958, filed on Apr. 22, 2009, now Pat. No. 8,810,192, which is a continuation of application No. 12/252,209, filed on Oct. 15, 2008, now abandoned, which is a continuation-in-part of application No. 11/837,407, filed on Aug. 10, 2007, now abandoned.

(60) Provisional application No. 60/980,663, filed on Oct. 17, 2007, provisional application No. 60/915,347, filed on May 1, 2007, provisional application No. 60/869,439, filed on Dec. 11, 2006, provisional application No. 60/822,047, filed on Aug. 10, 2006.

(51) Int. Cl.

| | | |
|---|---|---|
| *B60L 53/00* | (2019.01) | |
| *B60L 53/64* | (2019.01) | |
| *B60L 55/00* | (2019.01) | |
| *B60L 53/51* | (2019.01) | |
| *B60L 53/52* | (2019.01) | |
| *G06Q 30/02* | (2012.01) | |
| *G05B 13/02* | (2006.01) | |
| *H02J 3/00* | (2006.01) | |
| *H02J 3/38* | (2006.01) | |
| *H02J 7/04* | (2006.01) | |
| *H02J 7/34* | (2006.01) | |
| *H02J 13/00* | (2006.01) | |
| *H02J 7/00* | (2006.01) | |
| *H02J 3/32* | (2006.01) | |

(56) References Cited

U.S. PATENT DOCUMENTS

| | | | |
|---|---|---|---|
| 2004/0110044 A1* | 6/2004 | McArthur | B60L 53/65 429/443 |
| 2006/0250902 A1* | 11/2006 | Bender | B60L 50/16 369/1 |
| 2007/0282495 A1* | 12/2007 | Kempton | H02J 3/008 701/22 |
| 2008/0204012 A1* | 8/2008 | Krueger | A61B 5/06 324/300 |
| 2009/0200988 A1* | 8/2009 | Bridges | G06Q 30/0202 320/137 |

* cited by examiner

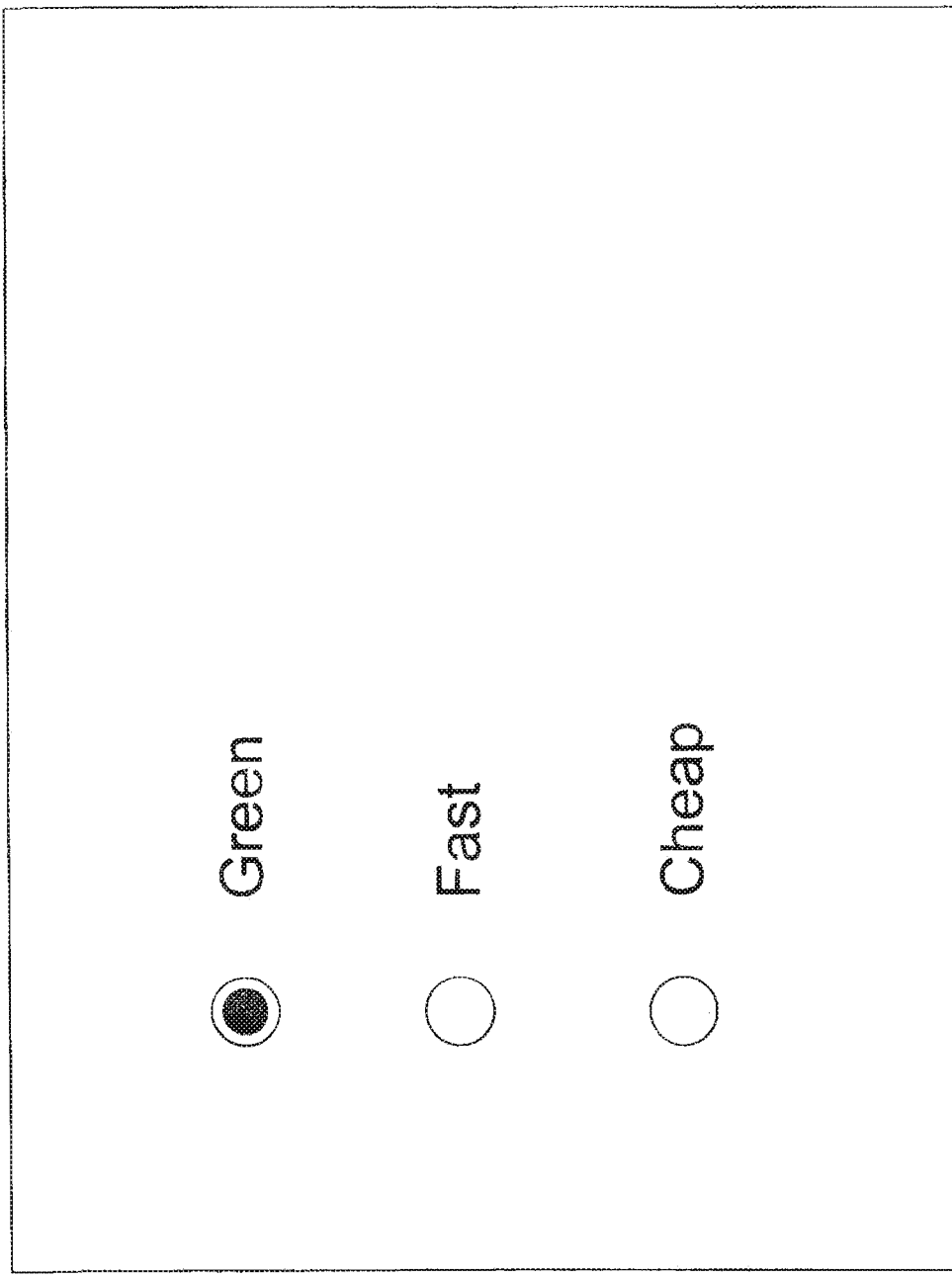

POWER AGGREGATION SYSTEM FOR DISTRIBUTED ELECTRIC RESOURCES

This application is a continuation of U.S. patent application Ser. No. 15/234,843, filed Aug. 11, 2016, which is a continuation of U.S. patent application Ser. No. 14/462,117, filed Aug. 18, 2014, now U.S. Pat. No. 9,436,948, which is a continuation of U.S. application Ser. No. 12/427,958, filed on Apr. 22, 2009, now U.S. Pat. No. 8,810,192, entitled "Power Aggregation System for Distributed Electric Resources", which is a continuation of U.S. patent application Ser. No. 12/252,209, filed on Oct. 15, 2008, entitled "Transceiver and Charging Component for a Power Aggregation System", which claims priority to U.S. Provisional Patent Application No. 60/980,663, filed Oct. 17, 2007. U.S. patent application Ser. No. 12/252,209 is also a continuation-in-part of U.S. patent application Ser. No. 11/837,407, filed on Aug. 10, 2007, entitled "Power Aggregation System for Distributed Electric Resources", which claims priority to U.S. Provisional Patent Application No. 60/822,047, filed on Aug. 10, 2006; U.S. Provisional Patent Application No. 60/869,439, filed on Dec. 11, 2006; and U.S. Provisional Patent Application No. 60/915,347, filed on May 1, 2007, the entire contents of each of which is incorporated herein by reference.

U.S. patent application Ser. No. 12/427,958 is also related to U.S. patent application Ser. No. 11/836,743, filed on Aug. 9, 2007; U.S. patent application Ser. No. 11/836,745, filed on Aug. 9, 2007; U.S. patent application Ser. No. 11/836,747, filed on Aug. 9, 2007; U.S. patent application Ser. No. 11/836,749, filed on Aug. 9, 2007; U.S. patent application Ser. No. 11/836,752, filed on Aug. 9, 2007; U.S. patent application Ser. No. 11/836,756; filed on Aug. 9, 2007; and U.S. patent application Ser. No. 11/836,760, filed on Aug. 9, 2007, the entire contents of each of which is incorporated herein by reference.

FIELD OF THE INVENTION

Embodiments of the present invention relate generally to the field of power aggregation and distribution. More specifically, embodiments of the present invention relate to a service for aggregating power distributed to and from electric resources.

BACKGROUND

Today's electric power and transportation systems suffer from a number of drawbacks. Pollution, especially greenhouse gas emissions, is prevalent because approximately half of all electric power generated in the United States is produced by burning coal. Virtually all vehicles in the United States are powered by burning petroleum products, such as gasoline or petro-diesel. It is now widely recognized that human consumption of these fossil fuels is the major cause of elevated levels of atmospheric greenhouse gases, especially carbon dioxide ($CO_2$), which in turn disrupts the global climate, often with destructive side effects. Besides producing greenhouse gases, burning fossil fuels also add substantial amounts of toxic pollutants to the atmosphere and environment. The transportation system, with its high dependence on fossil fuels, is especially carbon-intensive. That is, physical units of work performed in the transportation system typically discharge a significantly larger amount of $CO_2$ into the atmosphere than the same units of work performed electrically.

With respect to the electric power grid, expensive peak power—electric power delivered during periods of peak demand—can cost substantially more than off-peak power. The electric power grid itself has become increasingly unreliable and antiquated, as evidenced by frequent large-scale power outages. Grid instability wastes energy, both directly and indirectly (for example, by encouraging power consumers to install inefficient forms of backup generation).

While clean forms of energy generation, such as wind and solar, can help to address the above problems, they suffer from intermittency. Hence, grid operators are reluctant to rely heavily on these sources, making it difficult to move away from standard, typically carbon-intensive forms of electricity.

The electric power grid contains limited inherent facility for storing electrical energy. Electricity must be generated constantly to meet uncertain demand, which often results in over-generation (and hence wasted energy) and sometimes results in under-generation (and hence power failures).

Distributed electric resources, en masse can, in principle, provide a significant resource for addressing the above problems. However, current power services infrastructure lacks provisioning and flexibility that are required for aggregating a large number of small-scale resources (e.g., electric vehicle batteries) to meet medium- and large-scale needs of power services.

Thus, significant opportunities for improvement exist in the electrical and transportation sectors, and in the way these sectors interact. Fuel-powered vehicles could be replaced with vehicles whose power comes entirely or substantially from electricity. Polluting forms of electric power generation could be replaced with clean ones. Real-time balancing of generation and load can be realized with reduced cost and environmental impact. More economical, reliable electrical power can be provided at times of peak demand. Power services, such as regulation and spinning reserves, can be provided to electricity markets to stabilize the grid and provide a significant economic opportunity. Technologies can be enabled to provide broader use of intermittent power sources, such as wind and solar.

Robust, grid-connected electrical storage could store electrical energy during periods of over-production for redelivery to the grid during periods of under-supply. Electric vehicle batteries in vast numbers could participate in this grid-connected storage. However, a single vehicle battery is insignificant when compared with the needs of the power grid.

Low-level electrical and communication interfaces to enable charging and discharging of electric vehicles with respect to the grid is described in U.S. Pat. No. 5,642,270 to Green et al., entitled, "Battery powered electric vehicle and electrical supply system," incorporated herein by reference. The Green reference describes a bi-directional charging and communication system for grid-connected electric vehicles, but does not address the information processing requirements of dealing with large, mobile populations of electric vehicles, the complexities of billing (or compensating) vehicle owners, nor the complexities of assembling mobile pools of electric vehicles into aggregate power resources based on grid location, the aggregate power resources being robust enough to support firm power service contracts with grid operators.

BRIEF DESCRIPTION OF THE DRAWINGS

FIG. 23 is an illustration of an exemplary simple user interface for facilitating user controlled charging.

DETAILED DESCRIPTION

Overview

Figure 1:
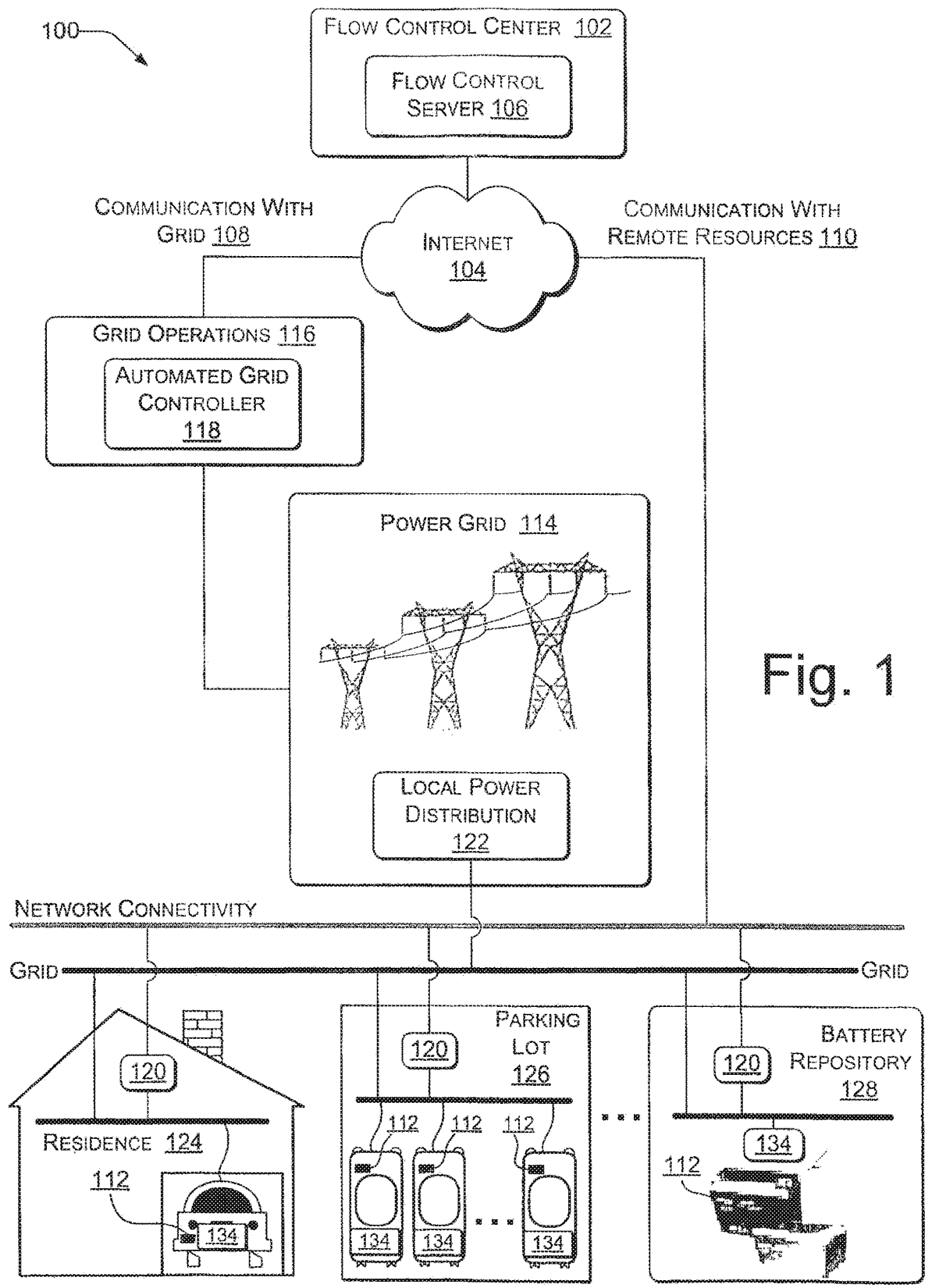
FIG. 1 is a diagram of an exemplary power aggregation system.

Described herein is a power aggregation system for distributed electric resources, and associated methods. In one implementation, the exemplary system communicates over the Internet and/or some other public or private networks with numerous individual electric resources connected to a power grid (hereinafter, "grid"). By communicating, the exemplary system can dynamically aggregate these electric resources to provide power services to grid operators (e.g. utilities, Independent System Operators (ISO), etc.).

"Power services" as used herein, refers to energy delivery as well as other ancillary services including demand response, regulation, spinning reserves, non-spinning reserves, energy imbalance, reactive power, and similar products.

"Aggregation" as used herein refers to the ability to control power flows into and out of a set of spatially distributed electric resources with the purpose providing a power service of larger magnitude.

"Charge Control Management" as used herein refers to enabling or performing the starting, stopping, or level-setting of a flow of power between u power grid and an electric resource.

"Power grid operator" as used herein, refers to the entity that is responsible for maintaining the operation and stability of the power grid within or across an electric control area. The power grid operator may constitute some combination of manual/human action/intervention and automated processes controlling generation signals in response to system sensors. A "control area operator" is one example of a power grid operator.

"Control area" as used herein, refers to a contained portion of the electrical grid with defined input and output ports. The net flow of power into this are must equal (within some error tolerance) the sum of the power consumption within the area and power outflow from the area.

"Power grid" as used herein means a power distribution system/network that connects producers of power with consumers of power. The network may include generators, transformers, interconnects, switching stations, and safety equipment as part of either/both the transmission system (i.e., bulk power) or the distribution system (i.e. retail power). The exemplary power aggregation system is vertically scalable for use within a neighborhood, a city, a sector, a control area, or (for example) one of the eight large-scale Interconnects in the North American Electric Reliability Council (NERC). Moreover, the exemplary system is horizontally scalable for use in providing power services to multiple grid areas simultaneously.

"Grid conditions" as used herein, refers to the need for more or less power flowing in or out of a section of the electric power grid, in response to one of a number of conditions, for example supply changes, demand changes, contingencies and failures, ramping events, etc. These grid conditions typically manifest themselves as power quality events such as under- or over-voltage events or under- or over-frequency events.

"Power quality events" as used herein typically refers to manifestations of power grid instability including voltage deviations and frequency deviations; additionally, power quality events as used herein also includes other disturbances in the quality of the power delivered by the power grid such as sub-cycle voltage spikes and harmonics.

"Electric resource" as used herein typically refers to electrical entities that can be commanded to do some or all of these three things: take power (act as load), provide power (act as power generation or source), and store energy. Examples may include battery/charger/inverter systems for electric or hybrid-electric vehicles, repositories of used but serviceable electric vehicle batteries, fixed energy storage, fuel cell generators, emergency generators, controllable loads, etc.

"Electric vehicle" is used broadly herein to refer to pure electric and hybrid electric vehicles, such as plug-in hybrid electric vehicles (PHEVs), especially vehicles that have significant storage battery capacity and that connect to the power grid for recharging the battery. More specifically, electric vehicle means a vehicle that gets some or all of its energy for motion and other purposes form the power grid. Moreover, an electric vehicle has an energy storage system, which may consist of batteries, capacitors, etc., or some combination thereof. An electric vehicle may or may not have the capability to provide power back to the electric grid.

Electric vehicle "energy storage systems" (batteries, supercapacitors, and/or other energy storage devices) are used herein as a representative example of electric resources intermittently or permanently connected to the grid that can have dynamic input and output of power. Such batteries can function as a power source or a power load. A collection of aggregated electric vehicle batteries can become a statistically stable resource across numerous batteries, despite recognizable tidal connection trends (e.g., an increase in the total number of vehicles connected to the grid at night; a downswing in the collective number of connected batteries as the morning commute begins, etc.). Across vast numbers of electric vehicle batteries, connection trends are predictable and such batteries become a stable and reliable resource to call upon, should the grid or a part of the grid (such as a person's home in a blackout) experience a need for increased or decreased power. Data collection and storage also enable the power aggregation system to predict connection behavior on a per-user basis.

Exemplary System

FIG. 1 shows an exemplary power aggregation system 100. A flow control center 102 is communicatively coupled with a network, such as a public/private mix that includes the Internet 104, and includes one or more servers 106 providing a centralized power aggregation service. "Internet" 104 will be used herein as representative of many different types of communicative networks and network mixtures (e.g., one or more wide area networks public or private—and/or one or more local area networks). Via a network, such as the Internet 104, the flow control center 102 maintains communication 108 with operators of power grid(s), and communication 110 with remote resources, i.e., communication with peripheral electric resources 112 ("end" or "terminal" nodes/devices of a power network) that are connected to the power grid 114. In one implementation, powerline communicators (PLCs), such as those that include or consist of Ethernet-over-powerline bridges 120 are implemented at connection locations so that the "last mile" (in this case, last feet—e.g., in a residence 124) of Internet communication with remote resources is implemented over the same wire that connects each electric resource 112 to the power grid 114. Thus, each physical location of each electric resource 112 may be associated with a corresponding Ethernet-over-powerline bridge 120 (hereinafter, "bridge") at or near the same location as the electric resource 112. Each bridge 120 is typically connected to an Internet access point of a location owner, as will be described in greater detail below. The communication medium from flow control center 102 to the connection location, such as residence 124, can take many forms, such as cable modem, DLS, satellite, fiber, WiMax, etc. In a variation, electric resources 112 may connect with the Internet by a different medium than the same power wire that connects them to the power grid 114. For example, a given electric resource 112 may have its own wireless capability to connect directly with the Internet 104 or an Internet access point and thereby with the flow control center 102.

Electric resources 112 of the exemplary power aggregation system 100 may include the batteries of electric vehicles connected to the power grid 114 at residences 124, parking lots 126, etc.; batteries in a repository 128, fuel cell generator's, private dams, conventional power plants, and other resources that produce electricity and/or store electricity physically or electrically.

In one implementation, each participating electric resource 112 or group of local resources has a corresponding remote intelligent power flow (IPF) module 134 (hereinafter, "remote IPF module" 134). The centralized flow control center 102 administers the power aggregation system 100 by communicating with the remote IPF modules 134 distributed peripherally among the electric resources 112. The remote IPF modules 134 perform several different functions, including, but not limited to, providing the flow control center 102 with the statuses of remote resources; controlling the amount, direction, and timing of power being transferred into or out of a remote electric resource 112; providing metering of power being transferred into or out of a remote electric resource 112; providing safety measures during power transfer and changes of conditions in the power grid 114; logging activities; and providing self-contained control of power transfer and safety measures when communication with the flow control center 102 is interrupted. The remote IPF modules 134 will be described in greater detail below.

In another implementation, instead of having an IPF module 134, each electric resource 112 may have a corresponding transceiver (not shown) to communicate with a local charging component (not shown). The transceiver and charging component, in combination, may communicate with flow control center 102 to perform some or all of the above mentioned functions of IPF module 134. An exemplary transceiver and charging component are shown in FIG. 2B and are described in greater detail herein.

Figure 2A:
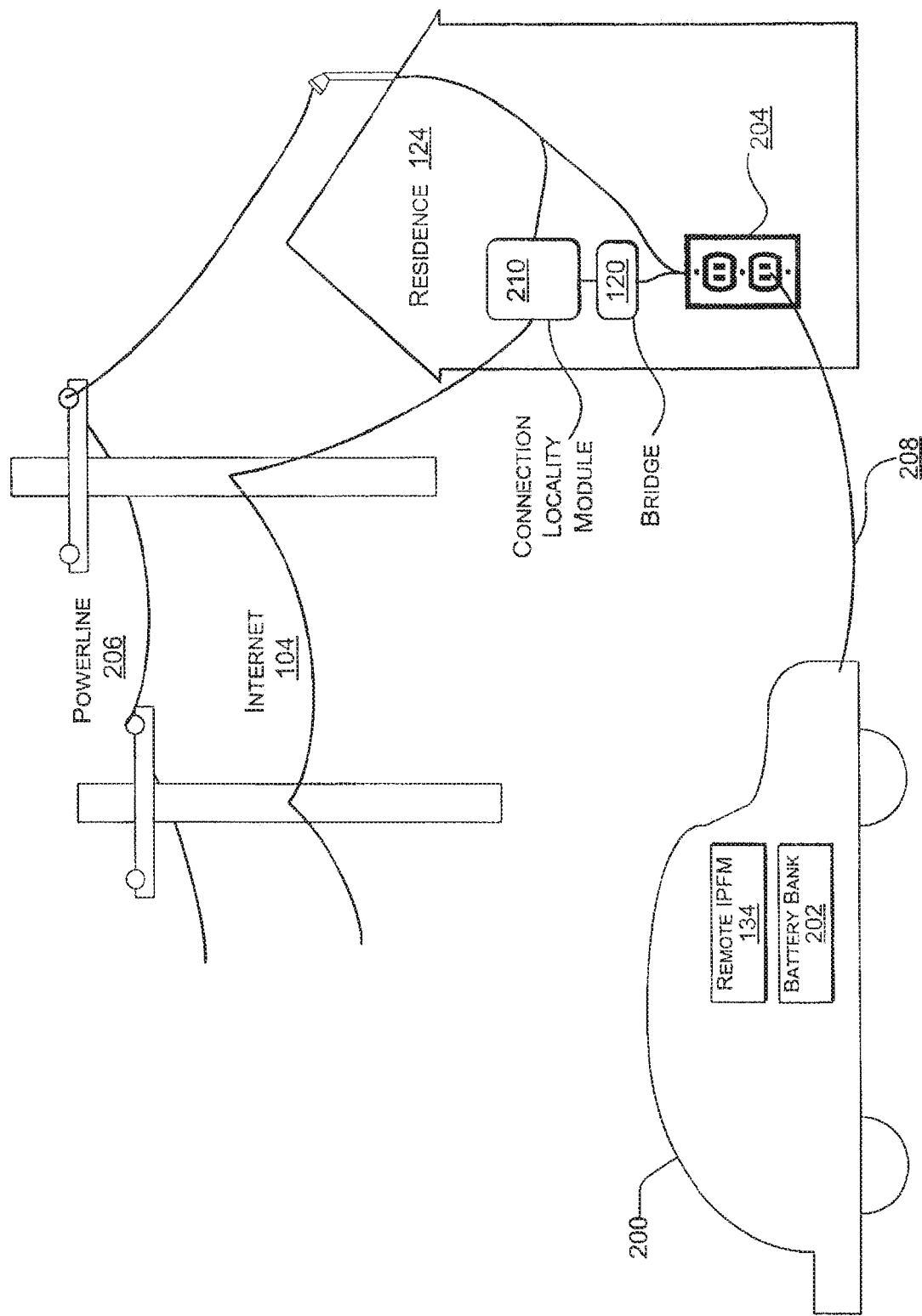
FIGS. 2A-2B are diagrams of exemplary connections between an electric vehicle, the power grid, and the Internet.
Figure 2B:
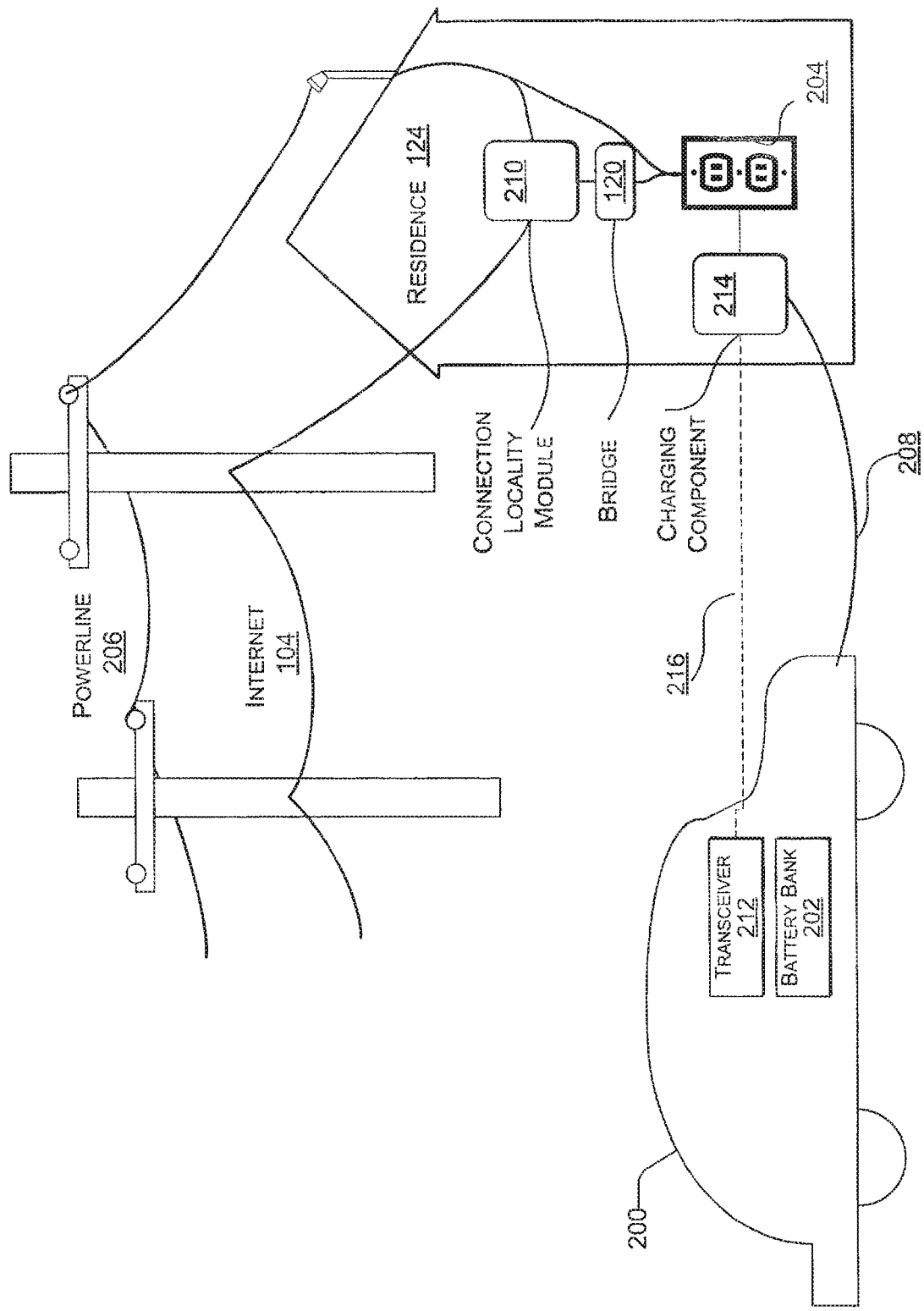

FIG. 2A shows another view of exemplary electrical and communicative connections to an electric resource 112. In this example, an electric vehicle 200 includes a battery bank 202 and an exemplary remote IPF module 134. The electric vehicle 200 may connect to a conventional wall receptacle (wall outlet) 204 of a residence 124, the wall receptacle 204 representing the peripheral edge of the power grid 114 connected via a residential powerline 206.

In one implementation, the power cord 208 between the electric vehicle 200 and the wall outlet 204 can be composed of only conventional wire and insulation for conducting alternating current (AC) power to and from the electric vehicle 200. In FIG. 2A, a location-specific connection locality module 210 performs the function of network access point—in this case, the Internet access point. A bridge 120 intervenes between the receptacle 204 and the network access point so that the power cord 208 can also carry network communications between the electric vehicle 200 and the receptacle 204. With such a bridge 120 and connection locality module 210 in place in a connection location, no other special wiring or physical medium is needed to communicate with the remote IPF module 134 of the electric vehicle 200 other than a conventional power cord 208 for providing residential line current at any conventional voltage. Upstream of the connection locality module 210, power and communication with the electric vehicle 200 are resolved into the power line 206 and an Internet cable 104.

Alternatively, the power cord 208 may include safety features not found in conventional power and extension cords. For example, an electrical plug 212 of the power cord 208 may include electrical and/or mechanical safeguard components to prevent the remote IPF module 134 from electrifying or exposing the male conductors of the power cord 208 when the conductors are exposed to a human user.

In some embodiments, a radio frequency (RF) bridge (not shown) may assist the remote IPF module 134 in communicating with a foreign system, such as a utility smart meter (not shown) and/or a connection locality module 210. For example, the remote IPF module 134 may be equipped to communicate over power cord 208 or to engage in some form of RF communication, such as Zigbee or Bluetooth™, and the foreign system may be able to engage in a different form of RF communication. In such an implementation, the RF bridge may be equipped to communicate with both the foreign system and remote IPF module 134 and to translate communications from one to a form the other may understand, and to relay those messages. In various embodiments, the RF bridge may be integrated into the remote IPF module 134 or foreign system, or may be external to both. The communicative associations between the RF bridge and remote IPF module 134 and between the RF bridge and foreign system may be via wired or wireless communication.

FIG. 2B shows a further view of exemplary electrical and communicative connections to an electric resource 112. In this example, the electric vehicle 200 may include a transceiver 212 rather than a remote IPF module 134. The transceiver 212 may be communicatively coupled to a charging component 214 through a connection 216, and the charging component itself may be coupled to a conventional wall receptacle (wall outlet) 204 of a residence 124 and to electric vehicle 200 through a power cord 208. The other components shown in FIG. 2B may have the couplings and functions discussed with regard to FIG. 2A.

In various embodiments, transceiver 212 and charging component 214 may, in combination, perform the same functions as the remote IPF module 134. Transceiver 212 may interface with computer systems of electric vehicle 200 and communicate with charging component 214, providing charging component 214 with information about electric vehicle 200, such as its vehicle identifier, a location identifier, and a state of charge. In response, transceiver 212 may receive requests and commands which transceiver 212 may relay to vehicle 200's computer systems.

Charging component 214, being coupled to both electric vehicle 200 and wall outlet 204, may effectuate charge control of the electric vehicle 200. If the electric vehicle 200 is not capable of charge control management, charging component 214 may directly manage the charging of electric vehicle 200 and a power grid 114 in response to commands received from a flow control server 106. If, on the other hand, the electric vehicle 200 is capable of charge control management, charging component 214 may effectuate charge control by sending commands to the electric vehicle 200 through the transceiver 212.

In some embodiments, the transceiver 212 may be physically coupled to the electric vehicle 200 through a data port, such as an OBD-II connector. In other embodiments, other couplings may be used. The connection 216 between transceiver 212 and charging component 214 may be a wireless signal, such as a radio frequency (RF), such as a Zigbee, or Bluetooth™ signal. And charging component 214 may include a receiver socket to couple with power cord 208 and a plug to couple with wall outlet 204. In one embodiment, charging component 214 may be coupled to connection locality module 210 in either a wired or wireless fashion. For example, charging component 214 might have a data interface for communicating wirelessly with both the transceiver 212 and locality module 210. In such an embodiment, the bridge 120 may not be required.

Figure 8A:
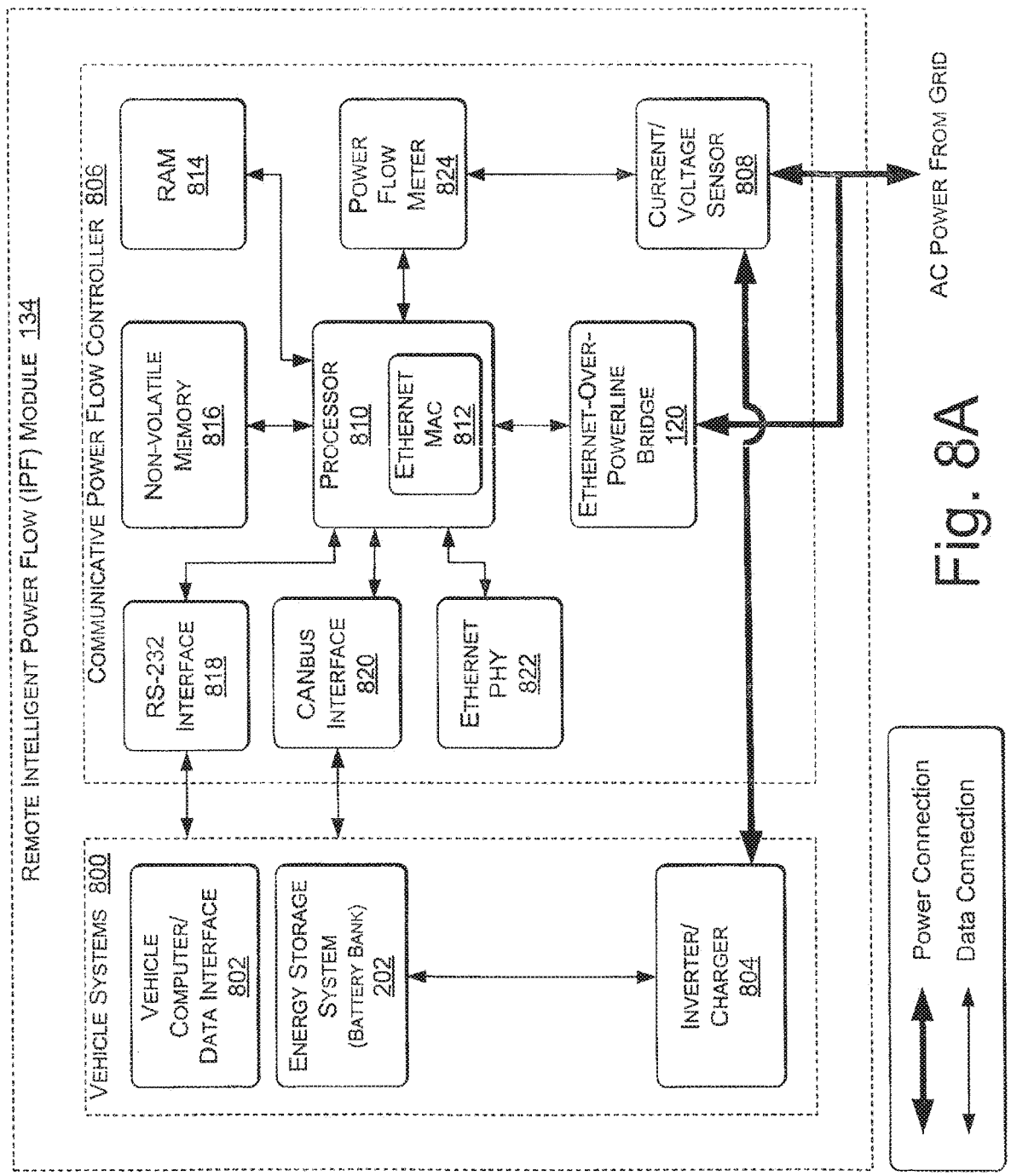
FIG. 8A is a block diagram of an exemplary remote intelligent power flow module.
Figure 8B:
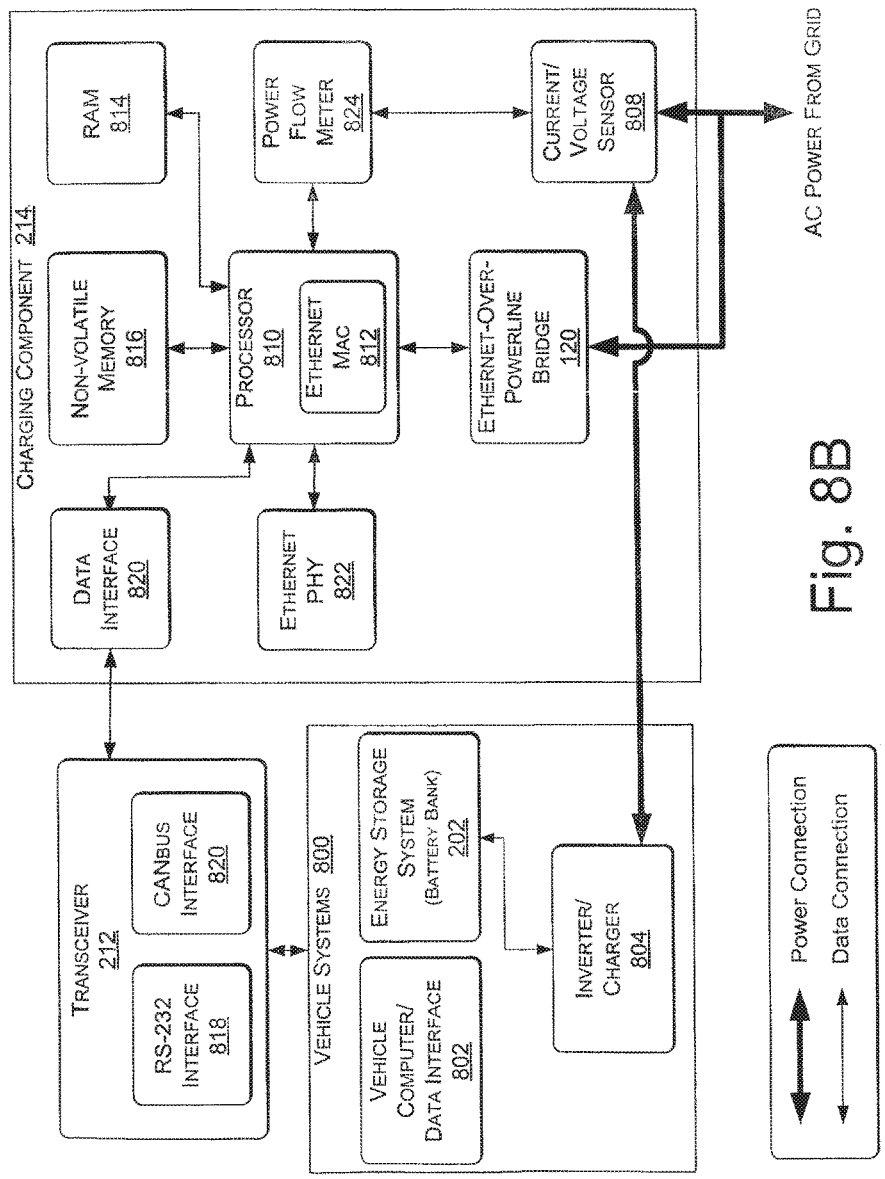
FIG. 8B is a block diagram of an exemplary transceiver and charging component combination.

Further details about the transceiver 212 and charging component 214 are illustrated by FIG. 8B and described in greater detail herein.

Figure 3:
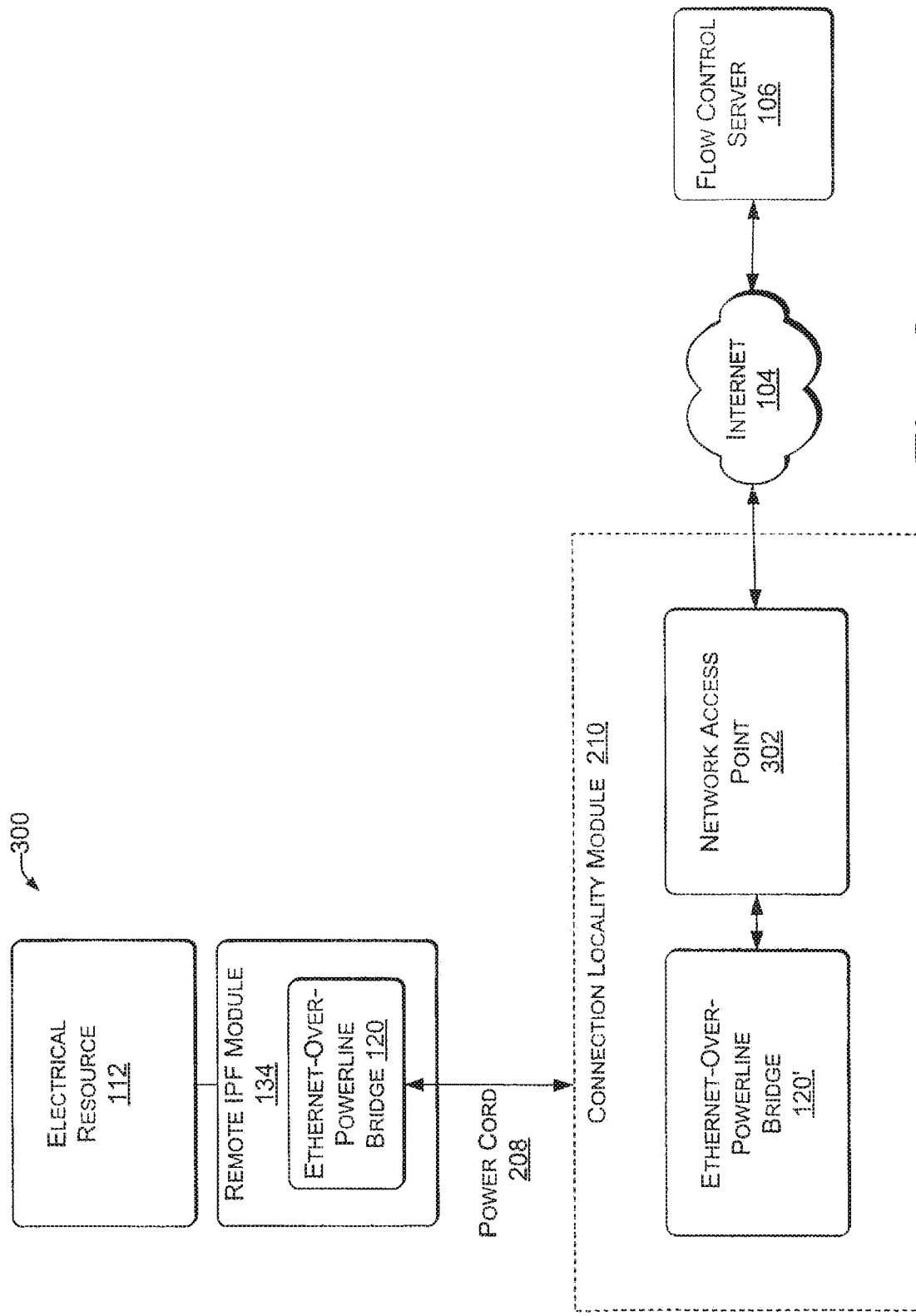
FIG. 3 is a block diagram of exemplary connections between an electric resource and a flow control server of the power aggregation system.

FIG. 3 shows another implementation of the connection locality module 210 of FIG. 2, in greater detail. In FIG. 3, an electric resource 112 has an associated remote IPF module 134, including a bridge 120. The power cord 208 connects the electric resource 112 to the power grid 114 and also to the connection locality module 210 in order to communicate with the flow control server 106.

The connection locality module 210 includes another instance of a bridge 120, connected to a network access point 302, which may include such components as a router, switch, and/or modem, to establish a hardwired or wireless connection with, in this case, the Internet 104. In one implementation, the power cord 208 between the two bridges 120 and 120' is replaced by a wireless Internet link, such as a wireless transceiver in the remote IPF module 134 and a wireless router in the connection locality module 210.

In other embodiments, a transceiver 212 and charging component 214 may be used instead of a remote IPF module 134. In such an embodiment, the charging component 214 may include or be coupled to a bridge 120, and the connection locality module 210 may also include a bridge 120', as shown. In yet other embodiments, not shown, charging component 214 and connection locality module 210 may communicate in a wired or wireless fashion, as mentioned previously, without bridges 120 and 120'. The wired or wireless communication may utilize any sort of connection technology known in the art, such as Ethernet or RF communication, such as Zigbee, or Bluetooth™.

Exemplary System Layouts

Figure 4:
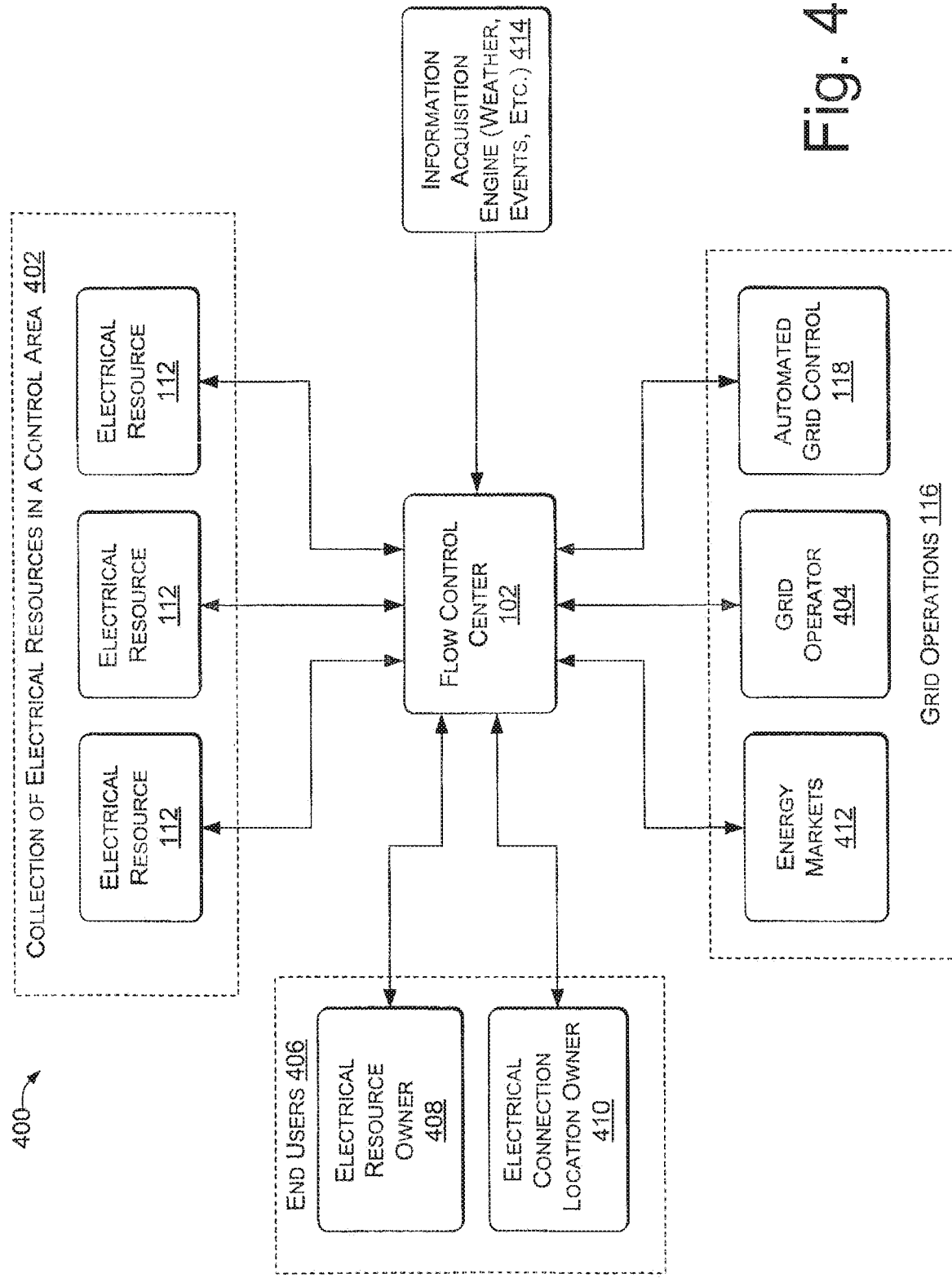
FIG. 4 is a diagram of an exemplary layout of the power aggregation system.

FIG. 4 shows an exemplary layout 400 of the power aggregation system 100. The flow control center 102 can be connected to many different entities, e.g., via the Internet 104, for communicating and receiving information. The exemplary layout 400 includes electric resources 112, such as plug-in electric vehicles 200, physically connected to the grid within a single control area 402. The electric resources 112 become an energy resource for grid operators 404 to utilize.

The exemplary layout 400 also includes end users 406 classified into electric resource owners 408 and electrical connection location owners 410, who may or may not be one and the same. In fact, the stakeholders in an exemplary power aggregation system 100 include the system operator at the flow control center 102, the grid operator 404, the resource owner 408, and the owner of the location 410 at which the electric resource 112 is connected to the power grid 114.

Electrical connection location owners 410 can include:
Rental car lots—rental car companies often have a large portion of their fleet parked in the lot. They can purchase fleets of electric vehicles 200 and, participating in a power aggregation system 100, generate revenue from idle fleet vehicles.
Public parking lots—parking lot owners can participate in the power aggregation system 100 to generate revenue from parked electric vehicles 200. Vehicle owners can be offered free parking, or additional incentives, in exchange for providing power services.

Workplace parking—employers can participate in a power aggregation system 100 to generate revenue from parked employee electric vehicles 200. Employees can be offered incentives in exchange for providing power services.

Residences—a home garage can merely be equipped with a connection locality module 210 to enable the homeowner to participate in the power aggregation system 100 and generate revenue from a parked car. Also, the vehicle battery 202 and associated power electronics within the vehicle can provide local power backup power during times of peak load or power outages.

Residential neighborhoods—neighborhoods can participate in a power aggregation system 100 and be equipped with power-delivery devices (deployed, for example, by homeowner cooperative groups) that generate revenue form parked electric vehicles 200.

The grid operations 116 of FIG. 4 collectively include interactions with energy markets 412, the interactions of grid operators 404, and the interactions of automated grid controllers 118 that perform automatic physical control of the power grid 114.

The flow control center 102 may also be coupled with information sources 414 for input of weather reports, events, price feeds, etc. Other data sources 414 include the system stakeholders, public databases, and historical system data, which may be used to optimize system performance and to satisfy constraints on the exemplary power aggregation system 100.

Thus, an exemplary power aggregation, system 100 may consist of components that:
communicate with the electric resources 112 to gather data and actuate charging/discharging of the electric resources 112;
gather real-time energy prices;
gather real-time resource statistics;
predict behavior of electric resources 112 (connectedness, location, state (such as battery State-Of-Charge) at a given time of interest, such as a time of connect/disconnect;
predict behavior of the power grid 114/load;
encrypt communications for privacy and data security;
actuate charging of electric vehicles 200 to optimize some figure(s) of merit;
offer guidelines or guarantees about load availability for various points in the future, etc.

These components can be running on a single computer resource (computer, etc.), or on a distributed set of resources (either physically co-located or not).

Exemplary power aggregation systems 100 in such a layout 400 can provide many benefits: for example, lower-cost ancillary services (i.e., power services), fine-grained (both temporal and spatial) control over resource scheduling, guaranteed reliability and service levels, increased service levels via intelligent resource scheduling, and/or firming of intermittent generation sources such as wind and solar power generation.

The exemplary power aggregation system 100 enables a grid operator 404 to control the aggregated electric resources 112 connected to the power grid 114. An electric resource 112 can act as a power-source, load, or storage, and the resource 112 may exhibit combinations of these properties. Control of a set of electric resources 112 is the ability to actuate power consumption, generation, or energy storage from an aggregate of these electric resources 112.

Figure 5:
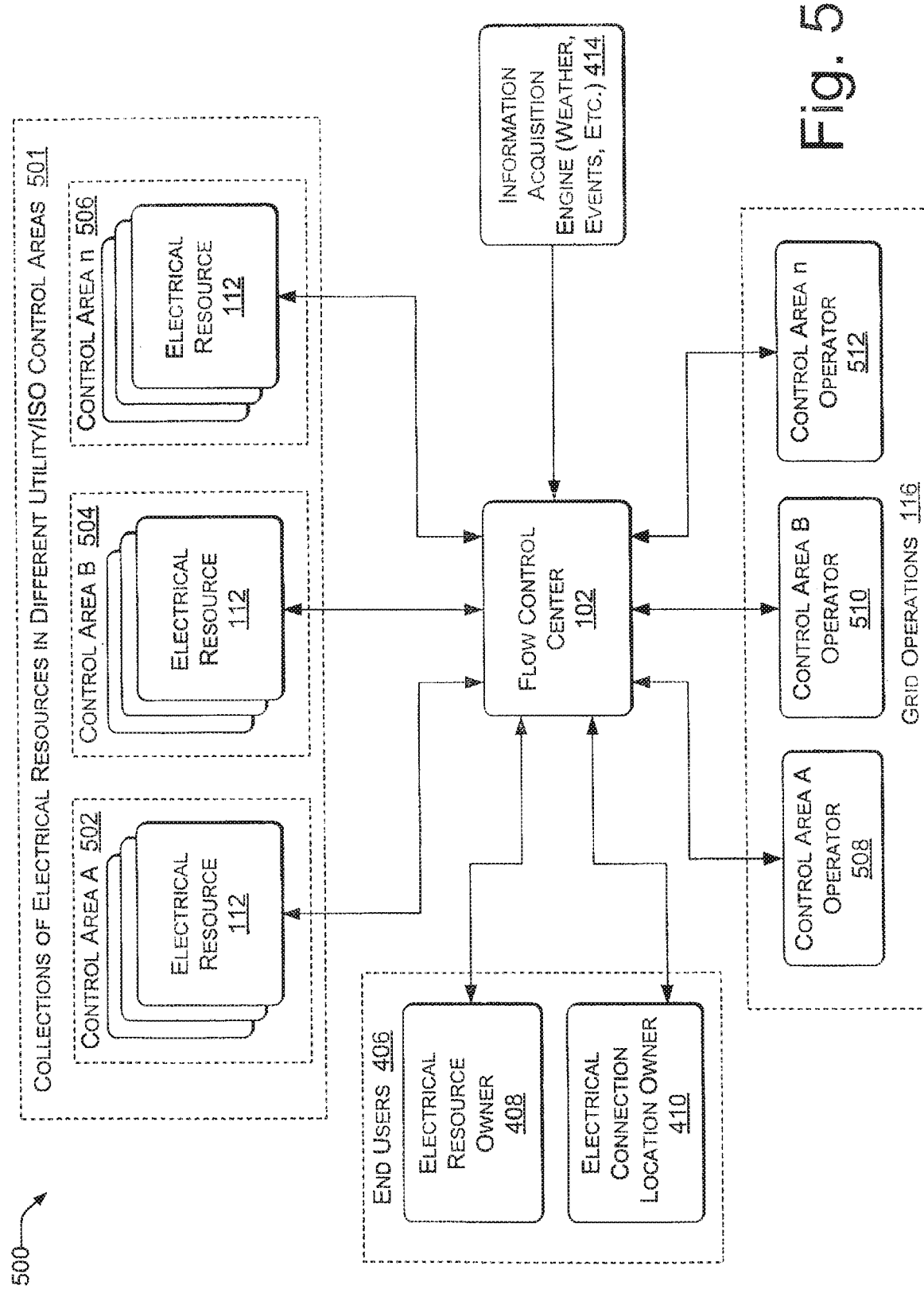
FIG. 5 is a diagram of exemplary control areas in the power aggregation system.

FIG. 5 shows the role of multiple control areas 402 in the exemplary power aggregation system 100. Each electric resource 112 can be connected to the power aggregation system 100 within a specific electrical control area. A single instance of the flow control center 102 can administer electric resources 112 from multiple distinct control areas 501 (e.g., control areas 502, 504, and 506). In one implementation, this functionality is achieved by logically partitioning resources within the power aggregation system 100. For example, when the control areas 402 include an arbitrary number of control areas, control area "A" 502, control area "B" 504, . . . , control area "n" 506, then grid operations 116 can include corresponding control area operators 508, 510, . . . and 512. Further division into a control hierarchy that includes control division groupings above and below the illustrated control areas 402 allows the power aggregation system 100 to scale to power grids 114 of different magnitudes and/or to varying numbers of electric resources 112 connected with a power grid 114.

Figure 6:
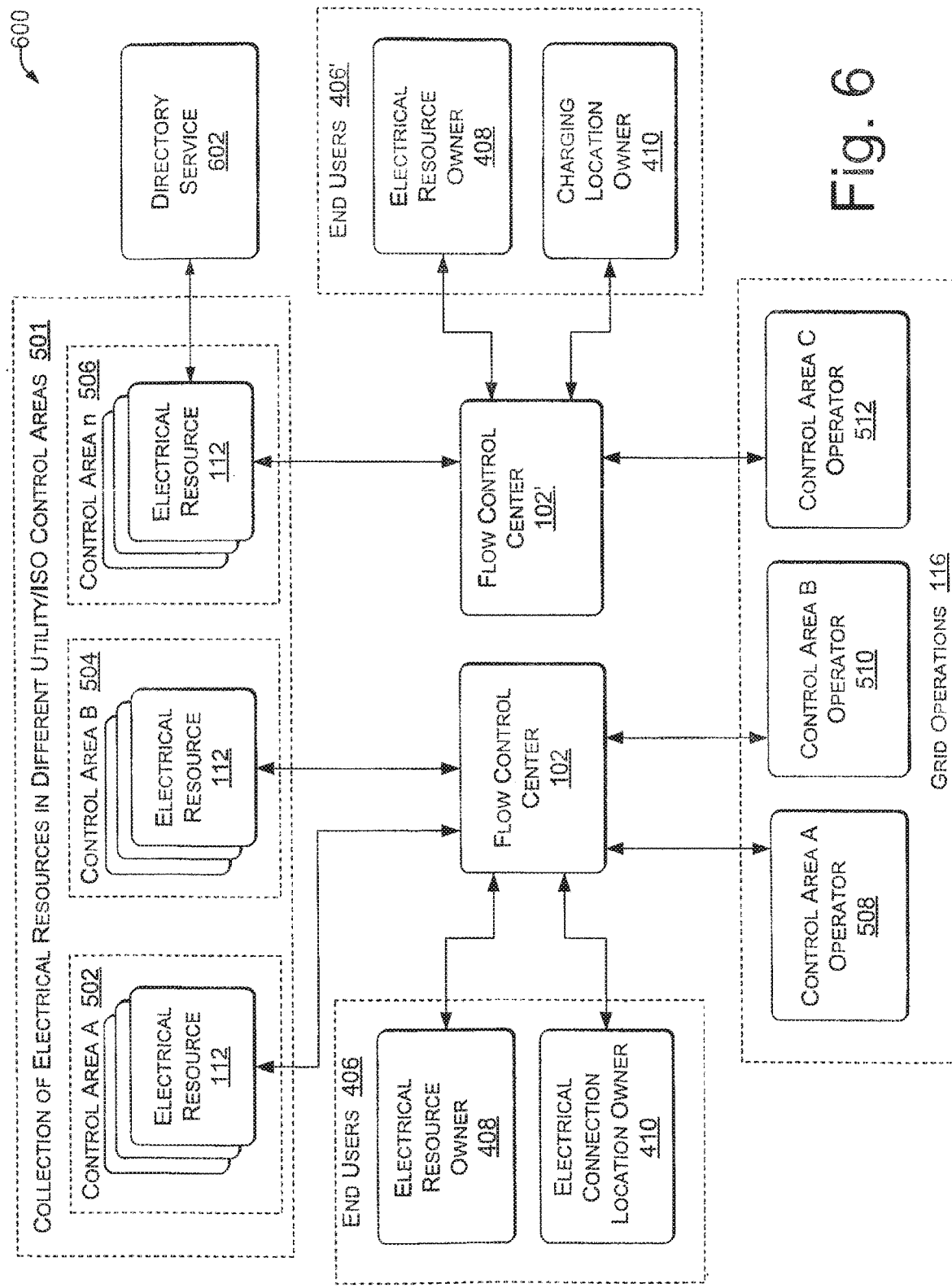
FIG. 6 is a diagram of multiple flow control centers in the power aggregation system and a directory server for determining a flow control center.

FIG. 6 shows an exemplary layout 600 of an exemplary power aggregation system 100 that uses multiple centralized flow control centers 102 and 102' and a directory server 602 for determining a flow control center. Each flow control center 102 and 102' has its own respective end users 406 and 406'. Control areas 402 to be administered by each specific instance of a flow control center 102 can be assigned dynamically. For example, a first flow control center 102 may administer control area A 502 and control area B 504, while a second flow control center 102' administers control area n 506. Likewise, corresponding control area operators (508, 510, and 512) are served by the same flow control center 102 that serves their respective different control areas.

In various embodiments, an electric resource may determine which flow control center 102/102' administers its control area 502/504/506 by communicating with a directory server 602. The address of the directory server 602 may be known to electric resource 112 or its associated IPF module 134 or charging component 214. Upon plugging in, the electric resource 112 may communicate with the directory server 602, providing the directory server 112 with a resource identifier and/or a location identifier. Based on this information, the directory server 602 may respond, identifying which flow control center 102/102' to use.

In another embodiment, directory server 602 may be integrated with a flow control server 106 of a flow control center 102/102'. In such an embodiment, the electric resource 112 may contact the server 106. In response, the server 106 may either interact with the electric resource 112 itself or forward the connection to another flow control center 102/102' responsible for the location identifier provided by the electric resource 112.

On some embodiments, whether integrated with a flow control server 106 or not, directory server 602 may include a publicly accessible database for mapping locations to flow control centers 102/102'.

Exemplary Plow Control Server

Figure 7:
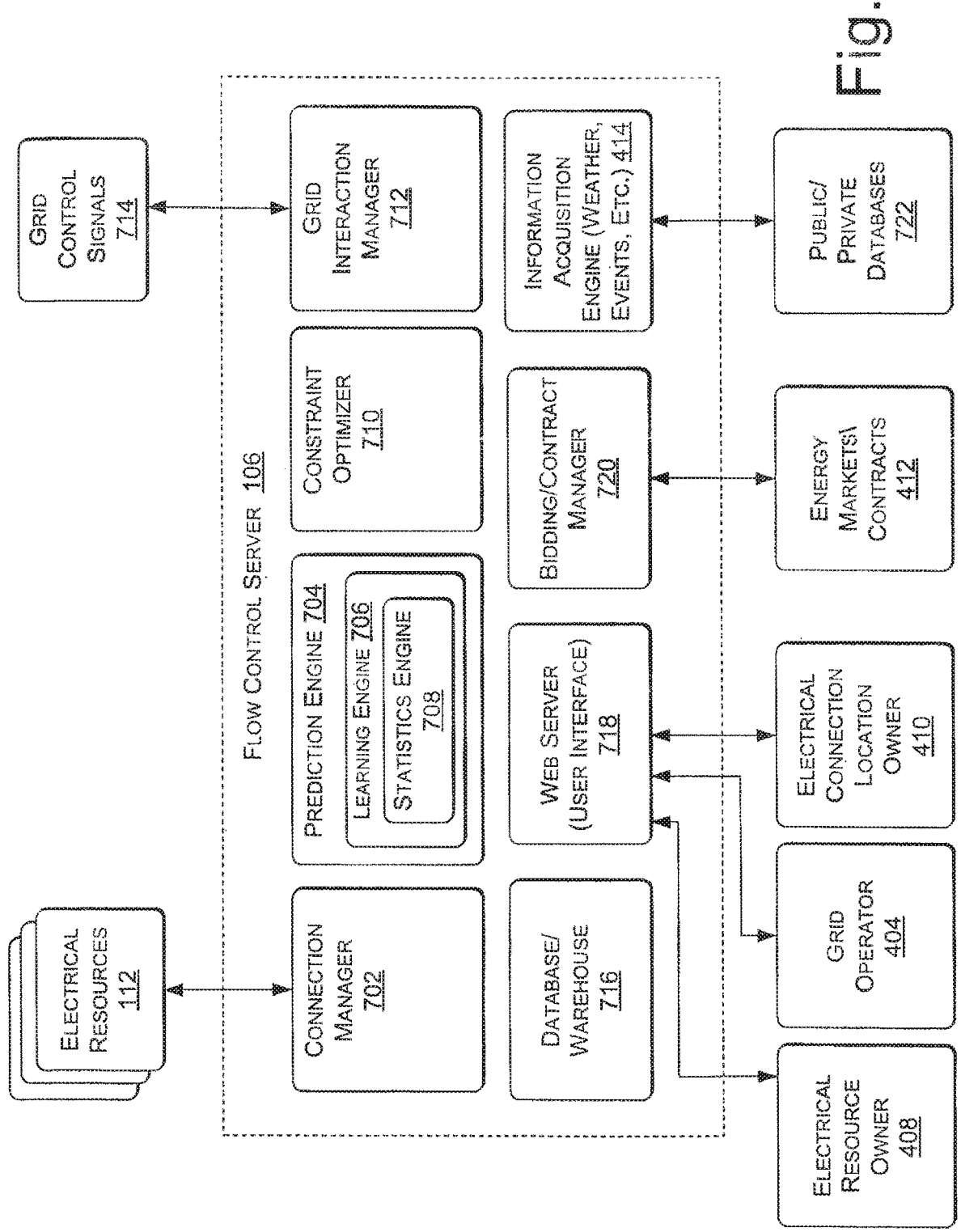
FIG. 7 is a block diagram of an exemplary flow control server.

FIG. 7 shows an exemplary server 106 of the flow control center 102. The illustrated implementation in FIG. 7 is only one example configuration, for descriptive purposes. Many other arrangements of the illustrated components or even different components constituting an exemplary server 106 of the flow control center 102 are possible within the scope of the subject matter. Such an exemplary server 106 and flow control center 102 can be executed in hardware, software, or combinations of hardware, software, firmware, etc.

The exemplary flow control server 106 includes a connection manager 702 to communicate with electric resources 112, a prediction engine 704 that may include a learning engine 706 and a statistics engine 708, a constraint optimizer 710, and a grid interaction manager 712 to receive grid control signals 714. Grid control signals 714 are sometimes referred to as generation control signals, such as automated generation control (AGC) signals. The flow control server 106 may further include a database/information warehouse 716, a web server 718 to present a user interface to electric resource owners 408, grid operators 404, and electrical connection location owners 410; a contract manager 720 to negotiate contract terms with energy markets 412, and an information acquisition engine 414 to track weather, relevant news events, etc., and download information from public and private databases 722 for predicting behavior of large groups of the electric resources 112, monitoring energy prices, negotiating contracts, etc.

Operation of an Exemplary Row Control Server

The connection manager 702 maintains a communications channel with each electric resource 112 that is connected to the power aggregation system 100. That is, the connection manager 702 allows each electric resource 112 to log on and communicate, e.g., using Internet Protocol (IP) if the network is the Internet 104. In other words, the electric resources 112 call home. That is, in one implementation they may initiate the connection with the server 106. This facet enables the exemplary IPF modules 134 to work around problems with firewalls, IP addressing, reliability, etc.

For example, when an electric resource 112, such as an electric vehicle 200 plugs in at home 124, the IPF module 134 can connect to the home's router via the powerline connection. The router will assign the vehicle 200 an address (DHCP), and the vehicle 200 can connect to the server 106 (no holes in the firewall needed from this direction).

If the connection is terminated for any reason (including the server instance dies), then the IPF module 134 knows to call home again and connect to the next available server resource.

Also, when a connection is terminated, the connection manager may notify other components of flow control server 106 to adjust an available resources level tracked by the flow control server 106. Further, if the connection remains terminated for a pre-determined length of time, the connection manager 702 or another component for flow control server 106 may notify an owner/user of the electric resource 112 via, for example, an email, phone call, or text message to alert him/her of the disconnect.

The grid interaction manager 712 receives and interprets signals from the interlace of the automated grid controller 118 of a grid operator 404. In one implementation, the grid interaction manager 712 also generates signals to send to automated grid controllers 118. The scope of the signals to be sent depends on agreements or contracts between grid operators 404 and the exemplary power aggregation system 100. In one scenario the grid interaction manager 712 sends information about the availability of aggregate electric resources 112 to receive power from the grid 114 or supply power to the grid 114. In another variation, a contract may allow the grid interaction manager 712 to send control signals to the automated grid controller 118—to control the grid 114, subject to the built-in constraints of the automated grid controller 118 and subject to the scope of control allowed by the contract.

The database 716 can store all of the data relevant to the power aggregation system 100 including electric resource logs, e.g., for electric vehicles 200, electrical connection information, per-vehicle energy metering data, historical usage patterns for future prediction, resource owner preferences, account information, etc.

The web server 718 provides a user interface to the system stakeholders, as described above. Such a user interface serves primarily as a mechanism for conveying information to the users, but in some cases, the user interface serves to acquire data, such as preferences, from the users. In one implementation, the web server 718 can also initiate contact with participating electric resource owners 408 to advertise offers for exchanging electrical power.

The bidding/contract manager 720 interacts with the grid operators 404 and their associated energy markets 412 to determine system availability, pricing, service labels, etc.

The information acquisition engine 414 communicates with public and private databases 722, as mentioned above, to gather data that is relevant to the operation of the power aggregation system 100.

The prediction engine 704 may use data from the data warehouse 716 to make predictions about electric resource behavior, such as when electric resources 112 will connect and disconnect, location-specific electric resource availability, electrical system load, real-time energy prices, etc. The predictions enable the power aggregation system 100 to utilize more fully the electric resources 112 connected to the power grid 114. The learning engine 706 may track, record, and process actual electric resource behavior, e.g., by learning behavior of a sample or cross-section of a large population of electric resources 112. The statistics engine 708 may apply various probabilistic techniques to the resource behavior to note trends and make predictions.

In one implementation, the prediction engine 704 performs predictions via collaborative filtering. The prediction engine 704 can also perform per-user predictions of one or more parameters, including, for example, connect-time, connect duration, state-of-charge at connect time, and connection location. In order to perform per-user prediction, the prediction engine 704 may draw upon information, such as historical data, connect time (day of week, week of month, month of year, holidays, etc.), state-of-charge at connect, connection location, etc. In one implementation, a time series prediction can be computer via a recurrent neural network, a dynamic Bayesian network, or other directed graphical model.

In one scenario, for one user disconnected from the grid 114, the prediction engine 704 can predict the time and/or duration of the next connection, the state-of-charge at connection time, the location of the connection (and may assign it a probability/likelihood). Once the resource 112 has connected, the time-of-connection, state-of-charge at-connection, and connection location become further inputs to refinements of the predictions of the connection duration. These predictions help to guide predictions of total system availability as well as to determine a more accurate cost function of resource allocation.

Building a parameterized prediction model for each unique user is not always scalable in time or space. Therefore, in one implementation, rather than use one model for each user in the system 100, the prediction engine 704 builds a reduced set of models where each model in the reduced set is used to predict the behavior of many users. To decide how to group similar users for model creation and assignment, the system 100 can identify features of each user, such as number of unique connections/disconnections per day, typical connection time(s), average connection duration, average state-of-charge at connection time, etc., and can create clusters of users in either a full feature space or in some reduced feature space that is computed via a dimensionality reduction algorithm such as Principal Components Analysis, Random Projection, etc. Once the prediction engine 704 has assigned users to a cluster, the collective data from all of the users in that cluster is used to create a predictive model that will be used for the predictions of each user in the cluster, in one implementation, the cluster assignment procedure is varied to optimize the system 100 for speed (less clusters), for accuracy (move clusters), or some combination of the two.

Over time, individual users may change their behaviors and may be reassigned to new clusters that fit their behavior better.

The constraint optimizer 710 combines information from the prediction engine 704, the data warehouse 716, and the contract manager 720 to generate resource control signals that will satisfy the system constraints. For example, the constraint, optimizer 710 can signal an electric vehicle 200 to charge its battery bank 202 at a certain charging rate and later to discharge the battery bank 202 for uploading power to the power grid 114 at a certain upload rate: the power transfer rates and the timing schedules of the power transfers optimized to fit the tracked individual connect and disconnect behavior of the particular electric vehicle 200 and also optimized to fit a daily power supply and demand "breathing cycle" of the power grid 114.

In one implementation, the constraint optimizer 710 plays a key role in converting generation control signals 714 into vehicle controls signals, mediated by the connection manager 702. Mapping generation controls signals 714 from a grid operator 404 into control signals that are sent to each unique electrical resource 112 in the system 100 is an example of a specific constraint optimization problem.

Each resource 112 has associated constraints, either hard or soft. Examples of resource constraints may include: price sensitivity of the owner, vehicle state-of-charge (e.g., if the vehicle 200 is fully charged, it cannot participate in loading the grid 114), predicted amount of time until the resource 132 disconnects from the system 100, owner sensitivity to revenue versus state-of-charge, electrical limits of the resource 114, manual charging overrides by resource owners 408, etc. The constraints on a particular resource 112 can be used to assign a cost for activating each of the resource's particular actions. For example, a resource whose storage system 202 has little energy stored in it will have a low cost associated with the charging operation, but a very high cost for the generation operation. A fully charged resource 112 that is predicted to be available for ten hours will have a lower cost generation operation than a fully charged resource 112 that is predicted to be disconnected within the next 15 minutes, representing the negative consequences of delivering a less-than-full resource to its owner.

The following is one example of converting one generating signal 714 that comprises a system operating level (e.g., −10 megawatts to +10 megawatts, where + represents load, − represents generation) to a vehicle control signal. It is worth noting that because the system 100 can meter the actual power flows in each resource 112, the actual system operating level is known at all times.

In this example, assume the initial system operating level is 0 megawatts, no resources are active (taking or delivering power from the grid), and the negotiated aggregation service contract level for the next hour is +/−5 megawatts.

In this implementation, the exemplary power aggregation system 100 maintains three lists of available resources 112. The first list contains resources 112 that can activated for charging (load) in priority order. There is a second list of the resources 112 ordered by priority for discharging (generation). Each of the resources 112 in these lists (e.g., all resources 112 can have a position in both lists) have an associated cost. The priority order of the lists is directly related to the cost (i.e., the lists are sorted from lowest cost to highest cost). Assigning cost values to each resource 112 is important because it enables the comparison of two operations that achieve similar results with respect to system operation. For example, adding one unit of charging (load, taking power from the grid) to the system is equivalent to removing one unit of generation. To perform any operation that increases or decreases the system output, there may be multiple action choices and in one implementation the system 100 selects the lowest cost operation. The third list of resources 112 contains resources with hard constraints. For example, resources whose owners 408 have overridden the system 100 to force charging will be placed on the third list of static resources.

At time "1," the grid-operator-requested operating level changes to +2 megawatts. The system activates charging the first 'n' resources from the list, wherein 'n' is the number of resources whose additive load is predicted to equal 2 megawatts. After the resources are activated, the results of the activations are monitored to determine the actual result of the action. If more than 2 megawatts of load is active, the system will disable charging in reverse priority order to maintain system operation within the error tolerance specified by the contract.

From time "1" until time "2," the requested operating level remains constant at 2 megawatts. However, the behavior of some of the electrical resources may not be static. For example, some vehicles 200 that are part of the 2 megawatts system operation may become full (state-of-charge=100%) or may disconnect from the system 100. Other vehicles 200 may connect to the system 100 and demand immediate charging. All of these actions will cause a change in the operating level of the power aggregation system 100. Therefore, the system 100 continuously monitors the system operating level and activates or deactivates resources 112 to maintain the operating level within the error tolerance specified by the contract.

At time "2," the grid-operator-requested operating level decreases to −1 megawatts. The system consults the lists of available resources and chooses the lowest cost set of resources to achieve a system operating level of −1 megawatts. Specifically, the system moves sequentially through the priority lists, comparing the cost of enabling generation versus disabling charging, and activating the lowest cost resource at each time step. Once the operating level reaches −1 megawatts, the system 100 continues to monitor the actual operating level, looking for deviations that would require the activation of an additional resource 112 to maintain the operating level within the error tolerance specified by the contract.

In one implementation, an exemplary costing mechanism is fed information on the real-time grid generation mix to determine the marginal consequences of charging or generation (vehicle 200 to grid 114) on a "carbon footprint," the impact on fossil fuel resources and the environment in general. The exemplary system 100 also enables optimizing for any cost metric, or a weighted combination of several. The system 100 can optimize figures of merit that may include, for example, a combination of maximizing economic value and minimizing environmental impact, etc.

In one implementation, the system 100 also uses cost as a temporal variable. For example, if the system 100 schedules a discharged pack to charge during an upcoming time window, the system 100 can predict its look-ahead cost profile as it charges, allowing the system 100 to further optimize, adaptively. That is, in some circumstances the system 100 knows that is will have a high-capacity generation resource by a certain future time.

Multiple components of the flow control server 106 constitute a scheduling system that has multiple functions and components:

- data collection (gathers real-time data and stores historical data);
- projections via the prediction engine 704, which inputs real-time data, historical data, etc.; and outputs resource availability forecasts;
- optimizations built on resource availability forecasts, constraints, such as command signals from grid operators 404, user preferences, weather conditions, etc. The optimizations can take the form of resource control plans that optimize a desired metric.

The scheduling function can enable a number of useful energy services, including:

- ancillary services, such rapid response services and fast regulation;
- energy to compensate for sudden, foreseeable, or unexpected grid imbalances;
- response to routine and unstable demands;
- firming of renewable energy sources (e.g., complementing wind-generated power).

Exemplary Remote IPF Module

FIG. 8A shows the remote IPF module 134 of FIGS. 1 and 2 in greater detail. The illustrated remote IPF module 134 is only one example configuration, for descriptive purposes. Many other arrangements of the illustrated components or even different components constituting an exemplary remote IPF module 134 are possible within the scope of the subject matter. Such an exemplary remote IPF module 134 has some hardware components and some components that can be executed in hardware, software, or combinations of hardware, software, firmware, etc. In other embodiments, executable instructions configured to perform some or all of the operations of remote IPF module 134 may be added to hardware of an electric resource 112 such as an electric vehicle that, when combined with the executable instructions, provides equivalent functionality to remote IPF module 134. References to remote IPF module 134 as used herein include such executable instructions.

The illustrated example of a remote IPF module 134 is represented by an implementation suited for an electric vehicle 200. Thus, some vehicle systems 800 are included as part of the exemplary remote IPF module 134 for the sake of description. However, in other implementations, tire remote IPF module 134 may exclude some or all of the vehicles systems 800 from being counted as components of the remote IPF module 134.

The depicted vehicle systems 800 include a vehicle computer and data interface 802, an energy storage system, such as a battery bank 202, and an inverter/charger 804. Besides vehicle systems 800, the remote IPF module 134 also includes a communicative power flow controller 806. The communicative power flow controller 806 in turn includes some components that interface with AC power from the grid 114, such as a powerline communicator, for example an Ethernet-over-powerline bridge 120, and a current or current/voltage (power) sensor 808, such as a current sensing transformer.

The communicative power flow controller 806 also includes Ethernet and information processing components, such as a processor 810 or microcontroller and an associated Ethernet media access control (MA) address 812; volatile random access memory 814, nonvolatile memory 816 or data storage, an interface such as an RS-232 interface 818 or a CANbus interface 820; an Ethernet physical layer interface 822, which enables wiring and signaling according to Ethernet standards for the physical layer through means of network access at the MAC/Data Link layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The communicative power flow controller 806 also includes a bidirectional power flow meter 824 that tracks power transfer to and from each electric resource 112, in this case the battery bank 202 of an electric vehicle 200.

The communicative power flow controller 806 operates either within, or connected to an electric vehicle 200 or other electric resource 112 to enable the aggregation of electric resources 112 introduced above (e.g., via a wired or wireless communication interface), These above-listed components may vary among different implementations of the communicative power flow controller 806, but implementations typically include:

- an intra-vehicle communications mechanism that enables communication with other vehicle components;
- a mechanism to communicate with the flow control center 102;
- a processing element;
- a data storage element;
- a power meter; and
- optionally, a user interface.

Implementations of the communicative power flow controller 806 can enable functionality including:

- executing pre-programmed or learned behavior when the electric resource 112 is offline (not connected to Internet 104, or service is unavailable);
- storing locally-cached behavior profiles for "roaming" connectivity (what to do when charging on a foreign system, i.e., when charging in the same utility territory on a foreign meter or in a separate utility territory, or in disconnected operation, i.e., when there is no network connectivity);
- allowing the user to override current system behavior; and
- metering power-flow information and caching meter data during offline operation for later transmission.

Thus, the communicative power flow controller 806 includes a central processor 810, interfaces 818 and 820 for communication within the electric vehicle 200, a powerline communicator, such as an Ethernet-over-powerline bridge 120 for communication external to the electric vehicle 200, and a power flow meter 824 for measuring energy flow to and from the electric vehicle 200 via a connected AC powerline 208.

Operation of the Exemplary Remote IPF Module

Continuing with electric vehicles 200 as representative of electric resources 112, during periods when such an electric vehicle 200 is parked and connected to the grid 114, the remote IPF module 134 initiates a connection to the flow control server 106, registers itself, and waits for signals from the flow control server 106 that direct the remote IPF module 134 to adjust the flow of power into or out of the electric vehicle 200. These signals are communicated to the vehicle computer 802 via the data interface, which may be any suitable interface including the RS-232 interface 818 or the CANbus interface 820. The vehicle computer 802, following the signals received from the flow control server 106, controls the inverter/charger 804 to charge the vehicle's battery bank 202 or to discharge the batter bank 202 in upload to the grid 114.

Periodically, the remote IPF module 134 transmits information regarding energy flows to the flow control server 106. If, when the electric vehicle 200 is connected to the grid 114, there is no communications path to the flow control server 106 (i.e., the location is not equipped properly, or there is a network failure), the electric vehicle 200 can follow a preprogrammed or learned behavior of off-line operation, stored as a set of instructions in the nonvolatile memory 816. For example, the instructions may enable a standard charging mode (i.e., charging without charge control management), charging when time-of-use rates are low (in which case remote IPF module 134 may store a listing of such times), and/or charging based on preferences set up by a user of the vehicle. Also, energy transactions can also be cached in nonvolatile memory 816 for later transmission to the flow control server 106.

During periods when the electric vehicle 200 is in operation as transportation, the remote IPF module 134 listens passively, logging select vehicle operation data for later analysis and consumption. The remote IPF module 134 can transmit this data to the flow control server 106 when a communications channel becomes available.

Exemplary Power Flow Meter

Power is the rate of energy consumption per interval of time. Power indicates the quantity of energy transferred during a certain period of time, thus the units of power are quantities of energy per unit of time. The exemplary power flow meter 824 measures power for a given electric resource 112 across a bi-directional flow—e.g., power from grid 114 to electric vehicle 200 or from electric vehicle 200 to the grid 114. In one implementation, the remote IPF module 134 can locally cache readings from the power flow meter 824 to ensure accurate transactions with the central flow control server 106, even if the connection to the server is down temporarily, or if the server itself is unavailable.

Mobile Resource Locator

The exemplary power aggregation system 100 also includes various techniques for determining the electrical network location of a mobile electric resource 112, such as a plug-in electric vehicle 200. Electric vehicles 200 can connect to the grid 114 in numerous locations and accurate control and transaction of energy exchange can be enabled by specific knowledge of the charging location.

Some of the exemplary techniques for determining electric vehicle charging locations include:
querying a unique identifier for the location (via wired, wireless, etc.), which can be:
the unique ID of the network hardware at the charging site;
the unique ID of the locally installed smart meter, by communicating with the meter;
a unique IDS installed specifically for this purpose at a site; and
using GPS or other signal sources (cell, WiMAX, etc.) to establish a "soft" (estimated geographic) location, which is then refined based on user preferences and historical data (e.g., vehicles tend to be plugged-in at the owner's residence 124, not a neighbor's residence).

Exemplary Transceiver and Charging Component

FIG. 8B shows the transceiver 212 and charging component 214 of FIG. 2B in greater detail. The illustrated transceiver 212 and charging component 214 is only one example configuration, for descriptive purposes. Many other arrangements of the illustrated components or even different components constituting the transceiver 212 and charging component 214 are possible within the scope of the subject matter. Such a transceiver 212 and charging component 214 have some hardware components and some components that can be executed in hardware, software, or combinations of hardware, software, firmware, etc.

The illustrated example of the transceiver 2121 and charging component 214 is represented by an implementation suited for an electric vehicle 200. Thus, some vehicle systems 800 are illustrated to provide context to the transceiver 212 and charging component 214 components.

The depicted vehicles systems 800 include a vehicle computer and data interface 802, an energy storage system, such as a battery bank 202, and an inverter/charger 804. In some embodiments, vehicle systems 800 may include a data port, such as an OBD-11 port, that is capable of physically coupling with the transceiver 212. The transceiver 212 may then communicate with, the vehicle computer and data interface 802 through the data port, receiving information from electric resource 112 comprised by vehicle systems 800 and, in some embodiments, providing commands to the vehicle computer and data interface 802. In one implementation, the vehicle computer and data interface 802 may be capable of charge control management. In such an embodiment, the vehicle computer and data interface 802 may perform some or all of the charging component 214 operations discussed below. In other embodiments, executable instructions configured to perform some or all of the operations of the vehicle computer and data interface 802 may be added to hardware of an electric resource 112 such as an electric vehicle that, when combined with the executable instructions, provides equivalent functionality to the vehicle computer and data interface 802. References to the vehicle computer and data interface 802 as used herein include such executable instructions.

In various embodiments, the transceiver 212 may have a physical form that is capable of coupling to a data port of vehicle systems 800. Such a transceiver 212 may also include a plurality of interfaces, such as an RS-232 interface 818 and/or a CANBus interface 820. In various embodiments, the RS-232 interface 818 or CANBus interface 820 may enable the transceiver 212 to communicate with the vehicle computer and data interface 802 through the data port. Also, the transceiver may be or comprise an additional interface (not shown) capable of engaging in wireless communication with a data interface 820 of the charging component 214. The wireless communication may be of any form known in the art, such as radio frequency (RF) communication (e.g., Zigbee, and/or Bluetooth™ communication). In other embodiments, the transceiver may comprise a separate conductor or may be configured to utilize a powerline 208 to communicate with charging component 214. In yet other embodiments, not shown, transceiver 212 may simply be a radio frequency identification (RFID) tag capable of storing minimal information about the electric resource 112, such as a resource identifier, and of being read by a corresponding RFID reader of charging component 214. In such other embodiments, the RFID tag might not couple with a data port or communicate with the vehicle computer data interface 802.

As shown, the charging component 214 may be an intelligent, plug device that is physically connected to a charging medium, such as a power line 208 (the charging medium coupling the charging component 214 to the electric resource 112) and an outlet of a power grid (such as the wall outlet 204 shown in FIG. 2B). In other embodiments charging component 214 may be a charging station or some other external control. In some embodiments, the charging component 214 may be portable.

In various embodiments, the charging component 214 may include components that interface with AC power from the grid 114, such as a powerline communicator, for example an Ethernet-over-powerline bridge 120, and a current or current/voltage (power) sensor 808, such as a current sensing transformer.

In other embodiments, the charging component 214 may include a further Ethernet plug or wireless interface in place of bridge 120. In such an embodiment, data-over-powerline communication is not necessary, eliminating the need for a bridge 120. The Ethernet plug or wireless interface may communicate with a local access point, and through that access point to flow control server 106.

The charging component 214 may also include Ethernet and information processing components, such as a processor 810 or microcontroller and an associated Ethernet media access control (MAC) address 812; volatile random access memory 814, nonvolatile memory 816 or data storage, a data interface 826 for communicating with the transceiver 212, and an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The charging component 214 may also include a bidirectional power flow meter 824 that tracks power transfer to and from each electric resource 112, in this case the battery bank 202 of an electric vehicle 200.

Further, in some embodiments, the charging component 214 may include a credit card reader to enable a user to identify the electric resource 112 by providing credit card information. In such an embodiment, a transceiver 212 may not be necessary.

Additionally, in one embodiment, the charging component 214 may include a user interface, such as one of the user interfaces described in greater detail below.

Implementations of the charging component 214 can enable functionality including:
  executing pre-programmed or learned behaviors when the electric resource 112 is offline (not connected to internet 104, or service is unavailable);
  storing locally-cached behavior profiles for "roaming" connectivity (what to do when charging on a foreign system or in disconnected operation, i.e., when there is no network connectivity);
  allowing the user to override current system behavior; and
  metering power-flow information and caching meter data during offline operation for later transmission.

Operation of the Exemplary Transceiver and Charging Component

In various embodiments, a transceiver such as the transceiver 212 shown in FIG. 8B may obtain information about an electric resource through, for example, the data port described above. In some embodiments, the transceiver 212 may obtain the information when the electric resource 212 is plugged in, started, and/or operated. The transceiver 212 may then periodically obtain the information at various or pre-determined points of time thereafter. In some embodiments, the information may include at least one of an electric resource identifier, a state of charge of the electric resource, and/or a time since a last charge.

Upon obtaining the information or at a later time, the transceiver 212 may provide the information to the charging component 214 through, for example, the communicative coupling described above. In some embodiments, where the transceiver 212 may provide information to any of a number of geographically dispersed charging components 214, transceiver 212 may provide the information to the charging component 214 to which the electric resource 112 is coupled or to the charging component 214 that has the strongest communication signal. In other embodiments, the transceiver 212 may be specifically coupled, to a single charging component 214 and may only provide information to that specific component 214. In any embodiments, the transceiver 212 and the charging component 214 may utilize a form of encryption, such as key-based encryption, to communicate.

In some embodiments, where the electric resource 112 is capable of charge control management, the transceiver may receive one or more charge control commands from the charging component 214 and may provide the commands to the vehicle computer and data interface 802 to enable the electric resource to perform charge control management, such as starting and stopping a flow of power between the electric resource 112 and the grid 114.

In various embodiments, the charging component 214 may receive information about an electric resource 112 to which the charging component 214 is coupled via a charging medium. In some embodiments, the information may be received by the transceiver 212, as discussed above. In other embodiment, the information may be obtained in any number of other ways. For example, the information may be obtained from a user directly entering the information through, for instance, a user interface, from a credit card reader if a user swipes a credit card through the reader, or from an RFID reader if the electric resource 112 has an RFID tag. If a credit card reader is used, the information obtained from the user may be sent to a flow control server 106, or some other server, to obtain information about the electric resource 112 that is linked with the credit card information by, for example, a common owner/user.

Upon receiving information about an electric resource 112, the charging component 214 may, for example, provide the information to a flow control server 106 and receive, in response, one or more commands to cause the charging component 214 to effectuate charge control management. In some embodiments, in addition to providing the received information, charging component 214 may provide other information, such as an identification of who owns the meter account, what tariff the account is on, if resource 112 to grid 114 power flows are supported, a power rating of the charging connection, type description of the electric resource 112 (such as a make/model), anchor a description of the energy storage system 202 (e.g., battery size, power rating, etc.). In other embodiments, charging component 214 may possess instructions enabling it to effectuate charge control management itself, without communicating with a flow control server 106. In various embodiments, the charging component 214 may effectuate charge control management by starting or stopping a flow of power between the electric resource 112 and grid 114 or by providing the commands to electric resource 112 through transceiver 212. The charging component 214 may provide the commands if, for example, the electric resource 112 is capable of performing charge control management itself. In some embodiments, the information provided by transceiver 212 may include an indication of whether the electric resource 112 is capable of charge control management.

In various embodiments, when state of charge information about an electric resource 112 is unavailable, the charging component 214 may estimate the state of charge. For example, the charging component 214 may determine that the electric resource 112 is at or near full charge when a current flow of power to the electric resource 112 begins to slow or taper off. In other embodiments, the charging component 214 may estimate the state of charge by tracking how long it has been since the electric resource 112 was last charged. In yet other embodiments, other estimating techniques may be used.

If, when the electric resource 112 is connected to the grid 114, there is no communications path to the flow control server 106 (i.e., the location is not equipped properly, or there is a network failure), the charging component 214 can follow a preprogrammed or learned behavior of off-line operations, e.g., stored as a set of instructions in the nonvolatile memory 816. For example, the instructions may enable a standard charging mode (i.e., charging without charge control management), charging when time-of-use rates are low (in which case the charging component 214 may store a listing of such times), and/or charging based on preferences set up by a user of the vehicle. Also, energy transactions can also be cached in nonvolatile memory 816 for later transmission to the flow control server 106.

In some embodiments, power flow meter 824 may perform as described above with regard to FIG. 2A, and charging component 214 may determine a charging location in the same manner described above for the remote IPF module 134.

The exemplary power aggregation system 100 supports the following functions and interactions:

Setup. The power aggregation system 100 creates contracts outside the system and/or bids into open markets to procure contracts for power services via the web server 718 and contract manager 720. The system 100 then resolves these requests into specific power requirements upon dispatch from the grid operator 404, and communicates these requirements to vehicle owners 408 by one of several communication techniques.

Delivery. The grid interaction manager 712 accepts real-time grid control signals 714 from grid operators 404 through a power-delivery device, and responds to these signals 714 by delivering power services from connected electric vehicles 200 to the grid 114.

Reporting. After a power delivery event is complete, a transaction manager can report power services transactions stored in the database 716. A billing manager resolves these requests into specific credit or debit billing transactions. These transactions may be communicated to a grid operator's or utility's billing system for account reconciliation. The transactions may also be used to make payments directly to resource owners 408.

Matching Load to Generation. It is possible to match energy generation and load by either increasing/decreasing generation to match the load, or by increasing/decreasing the load to match the generation. Electric resources 112, such as electric vehicles, may present a large, flexible load to the grid 114 when they are charging. The load may be flexible because there may be little penalty for interrupting the charging of a resource 112, the charging interruption can be executed almost instantaneously, and because the resources 112 are typically plugged in for much more time than it takes to charge them. To utilize the possibility of a flexible load, flow control servers 106 may control the charging behavior of a plurality of electric resources 112. By increasing the number of electric resources 112 that are charging, the flow control servers 106 can increase the amount of load on the system, and by decreasing the number of electric resources 112 that are charging, the flow control servers 106 can decrease the amount of load on the system.

Up or Down Regulation on Load-Only Resources. In various embodiments, power aggregation system 100 may aggregate the electric power capacity of one or more distributed, electric load and storage resources, such as electric vehicles, into an amount sufficient to supply ancillary services, such as system regulations or spinning reserves, to a power grid 114 operator. Such a service can be supplied based upon electric resources 112 that are capable of bi-directional power flows, or based even solely upon load-only electric resources 112 (i.e., resources that are only capable of consuming and/or storing power, not providing it).

In various embodiments, a flow control center 102 may fulfill a capacity call from a grid operator based on a current load set-point of one or more electric resources 112 and on upper and lower rails of the one or more electric resources. The upper rail may be a maximum amount of charge the one or more electric resources 112 can consume. This amount may be the maximum capacity of the electric resources 112 or some lower value based on cost, environmental, and/or user-preference considerations. The lower rail—for load-only resources—may be a minimum amount that the electric resources may consume. This minimum amount may be a minimum capacity—such as consuming no power at all—or some higher value based on cost, environmental, and/or user-preference considerations.

For example, if a group of ten resources 112 are each consuming 5 kW (i.e., 50 kW total), and each has a maximum capacity of 10 kW and a minimum capacity of 0 kW, the flow control center 102 may answer capacity calls for up-regulation by bidding to take up to 50 kW less or capacity calls for down-regulation by bidding to take up to 50 kW more. The amount bid (i.e., answer to capacity call) may be determined by a variety of cost, environmental, and/or user-preference factors, in some embodiments.

If the flow control center 102 bids to take 30 kW less, then the flow control center 102 may reduce the charge taken by each of the ten electric resources 112 by 3 kW, or may stop six of the electric resources 112 from charging altogether. In other embodiments, other combinations of reducing the power taken and/or stopping charging may be utilized based on cost, environmental, and/or user-preference factors.

If the flow control center 102 bids to take 30 kW more, than the flow control center 102 may increase the charge taken by each of the ten electric resources 112 by 3 kW, or may increase the power consumed by six of the electric resources 112 to their maximum capacity. In other embodiments, other combinations of increasing the power taken by some or all of the electric resources 112 may be utilized based on cost, environmental, and/or user-preference factors.

In yet another example, all electric resources 112 may be offered to the grid operator as regulation-down capacity, charged to the greatest degree possible by satisfying grid operator capacity calls, and then incrementally charged only to the minimum degree necessary using normally purchased electricity.

Charge Control Management Based on Price Fluctuations. In some embodiments, utilities such as grid 114 may offer tariffs where the energy prices vary over time, such as time of use (TOU), critical peak pricing (CPP), and real time pricing (RTP). Flow control servers 106 may learn of this information from the utilities during negotiations for buying or selling power (described above) or at a later time or times. Based on the information, the flow control servers 106 may automatically control when the electric resources 112 recharge to ensure that the resources 112 are charging when it is cheaper to do so. Besides the rate structure and prices obtained from the utility, the flow control servers 106 may also take into account the type of electric resource 112, its state of charge, as well as user needs/preferences (i.e., when the user wall need to use the resource 112 again, how tolerant the user is of the resource 112 not being fully charged, etc.). This additional information can be provided by the user or estimated based on historical data associated with resource 112 or with resources 112 of other similar users.

Green Charging. In various embodiments, the power aggregation system 100 may offer users of electric resources 112 metrics of the amount of clean energy used and mechanisms for charging only with clean energy.

The power aggregation system 100 can meter the amount of net energy put into an electric resource 112, such as an electric vehicle 200, from the grid 114 and then offer the resource owner the option of "greening" that power, meaning using clean, renewable energy. In one embodiment, this could be accomplished by buying REC's (renewable energy credits) to match the amount of energy used.

While there are services, such websites, where users can self-report their energy usage, there is often no way to know how much electrical energy has been used with Plug-in Hybrid Electric Vehicles (PHEVs) 200 and Electric Vehicles (EVs) 200. This may be particularly hard with PHEVs 200 because of the mixed energy source approach (e.g., fuel plus electricity). By metering exactly the power into the electric resource 112, including in scenarios where the resource 112 may recharge at any number of different locations, potentially from different utility accounts, the power aggregation system 100 can give the user a guarantee that he or she is using only clean electricity. In some embodiments, this may be accomplished by associating a resource identifier with a clean charging setting. When the resource identifier is presented to the flow control server 106, the server 106 may, for example only charge if clean energy is available. Or if energy may be obtained from different sources (e.g., coal, wind) associated with different prices, flow control server 106 may elect to use the clean energy (subject perhaps to additional prices constraints provided by the user, etc.).

In some embodiments, the power aggregation system 100 may enable electric resources 112 to charge only when they are being used to firm renewable resources such as wind generation. Also, in another implementation, the power aggregation system 100 may enable resources 112 to charge only when the grid-mix is more environmentally aware manner.

Efficiency Metrics. In various embodiments, the power aggregation system may provide users of electric resources 112, such as electric vehicles 200, with various efficiency metrics. In some embodiments, one or more of the efficiency metrics may be used as a replacement for or supplement to the miles per gallon metric typically used for cars. Since that metric divides total miles driven by fuel used, it may be misleading for PHEVs, which run off both fuel and electricity. In various embodiments, metrics determined by the power aggregation system 100 might include an energy/distance metric (measured, for example, in Joules per mile), a cost/distance metric (measured, for example, in dollars spent of energy per mile), and/or a $CO_2$-equivalent greenhouse gas emissions/distance metric.

In some embodiments, efficiency metrics may be calculated by a remote IPF module 134 or a charging component 214, or calculated by a flow control server 106 and provided to the remote IPF module 134 or charging component 214. To calculate the efficiency metrics, a number of other metrics may be obtained. For example, a distance driven may be obtained from an electric vehicle's odometer. Energy metrics may be obtained from a power flow meter 824 and/or from a vehicle 200 gas gauge or fuel flow meter. Cost metrics may be obtained directly from a self-reporting user, from electric bill data tracked by the remote IPF module 134, charging component 214, or flow control server 106, from credit card data, and/or from average user price information. $CO_2$ metrics may be obtained from a self reporting user, from grid 314 mix data, from RECs, from power flow meters 824, and/or from $CO_2$ use averages. Once the efficiency metrics are calculated, they may be displayed to a user in the vehicle 200, on a remote IPF module 134 or charging component 214, via the website of a flow control center 102, and/or via other data access means. In some embodiments, this may involve generating a graph or some other chart.

In some embodiments, to achieve accurate measurements for the efficiency metrics, features may be added to vehicles 200. For example, vehicles 200 may include lifetime and hip counters for gallons of fuel used and lifetime and trip counters for kWh of electricity used, captured by power flow meter 824 (accounting for regenerative braking, the fuel engine recharging batteries, etc.—the power aggregation system 100 may need to meter various battery inputs and outputs and do some accounting).

In various embodiments, if a charging component 214 is used, the component 214 or flow control server 106 could back-calculate the amount of fuel used given a user's self-reported miles driven per year. From this, with gas and electricity cost and $CO_2$ info for the user's area (average), the charging component 214 or flow control server 106 could calculate efficiency metrics. In other embodiments, rather than requiring self-reporting, the charging component 214 or flow control server 106 could utilize a user's electric bill, local rate structure, grid mix, and/or greening preferences.

Low Carbon Fuel Standard (LCFS) Tracking. In some embodiments, the power aggregation system 100 may utilize the $CO_2$ efficiency memos described above to determine whether low carbon fuel standards are being met. Various governmental entities may increasingly impose such standards on users and vehicle 200 manufactures. By calculating $CO_2$ efficiency metrics for individual users, system 100 might also collectivize the metrics based on a vehicle 200 type, such as a make and/or model, and report the metrics to governmental entities, electric utilities, vehicle owners/drivers, and/or manufacturers.

Exemplary User Interfaces (UI)

Charging Station UI. An electrical charging station, whether free or for pay, can be installed with a user interface that presents useful information to the user. Specifically, by collecting information about the grid 114, the electric resource state, and the preferences of the user, the station can present information such as the current electricity price, the estimated recharge cost, the estimated time until recharge, the estimated payment for uploading power to the grid 114 (either total or per hour), etc. The information acquisition engine 414 communicates with the electric resource 112 and with public and/or private data networks 722 to acquire the data used in calculating this information.

The types of information gathered from the electric resource 112 could include an electric resource identifier (resource ID) and state information like the state of charge of the electric resource 112. The resource ID could be used to obtain knowledge of the electric resource type and capabilities, preferences, etc. through lookup with the flow control server 106.

In various embodiments, the charging station system including the UI might also gather grid-based information, such as current and future energy costs at the charging station.

User Charge Control UI Mechanisms. In various embodiments, by default, electric resources 112 may receive charge control management via power aggregation system 100. In some embodiments, an override control may be provided to override charge control management and charge as soon as possible. The override control may be provided, in various embodiments, as a user interface mechanism of the remote IPF module 134, the charging component 214, of the electric resource (for example, if electric resource is a vehicle 200, the user interface control may be integrated with dash controls of the vehicle 200) or even via a web page offered by flow control server 106. The control could be presented, for example, as a button, a touch screen option, a web page, or some other UI mechanism. In one embodiment, the UI may be the UI illustrated by FIG. 23 and discussed in greater detail below. In some embodiments, the override would be a one-time override, only applying to a single plug-in session. Upon disconnecting and reconnecting, the user may again need to interact with the UI mechanism to override the charge control management.

In some embodiments, the user may pay more to charge with the override on than under charge control management, thus providing an incentive for the user to accept charge control management. Such a cost differential may be displayed or rendered to the user in conjunction with or on the UI mechanism. This differential could take into account time-varying pricing, such as Time of Use (TOU), Critical Peak Pricing (CPP), and Real-Time Pricing (RTP) schemes, as discussed above, as well as any other incentives, discounts, or payments that might be forgone by not accepting charge control management.

UI Mechanism for Management Preferences. In various embodiments, a user interface, mechanism of the remote IPF module 134, the charging component 214, of the electric resource (for example, if electric resource is a vehicle 200, the user interface control may be integrated with dash controls of the vehicle 200) or even via a web page offered by flow control server 106 may enable a user to enter and/or edit management preferences to affect charge control management of the user's electric resource 112. In some embodiments, the UI mechanism may allow the user to enter/edit general preferences, such as whether charge control management is enabled, whether vehicle-to-grid power flow is enabled or whether the electric resource 112 should only be charged with clean/green power. Also, in various embodiments, the UI mechanism may enable a user to prioritize relative desires for minimizing costs, maximizing payments (i.e., fewer charge periods for higher amounts), achieving a full state-of-charge for the electric resource 112, charging as rapidly as possible, and/or charging in as environmentally-friendly a way as possible. Additionally, the UI mechanism may enable a user to provide a default schedule for when the electric resource will be used (for example, if resource 112 is a vehicle 200, the schedule would be for when the vehicle 200 should be ready to drive). Further, the UI mechanism may enable the user to add or select special rules, such as a rule not to charge if a price threshold is exceeded or a rule to only use charge control management if it will earn the user at least a specified threshold of output. Charge control management may then be effectuated based on any part or all of these user entered preferences.

Simple User Interface. FIG. 23 illustrates a simple user interface (UI) which enables a user to control charging based on selecting among a limited number of high level preferences. For example, UI 2300 includes the categories "green", "fast", and "cheap" (with what is considered "green", "fast", and "cheap" varying from embodiment to embodiment). The categories shown in UI 2300 are selected only for the sake of illustration and may instead include these and/or any other categories applicable to electric resource 112 charging known in the art. As shown, the UI 2300 may be very basic, using well known form controls such as radio buttons. In other embodiments, other graphic controls known in the art may be used. The general categories may be mapped to specific charging behaviors, such as those described above, by a flow control server 106.

Electric Resource Communication Protocol

Figure 9:
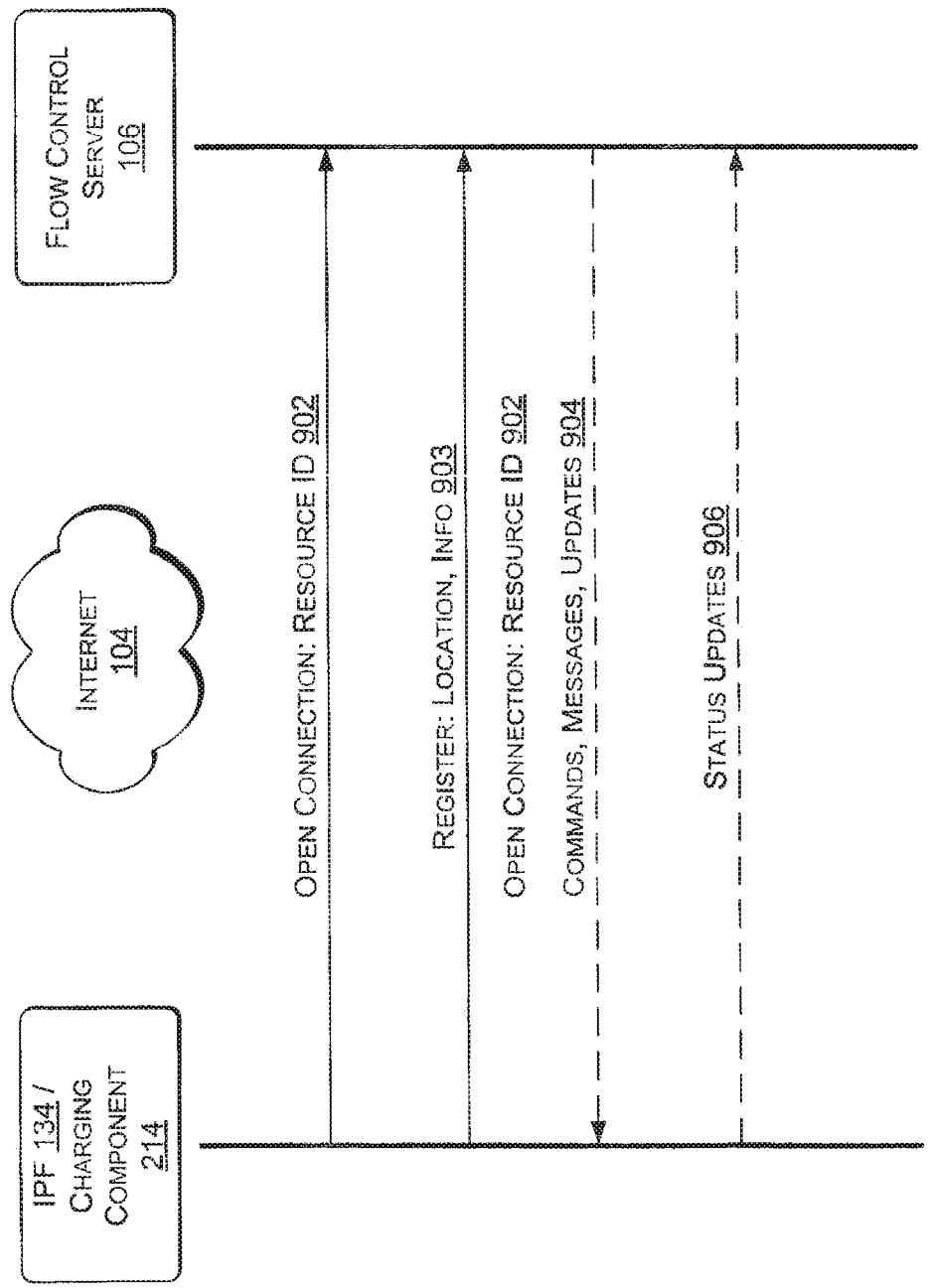
FIG. 9 is a diagram of an exemplary resource communication protocol.

FIG. 9 illustrates an exemplary resource communication protocol. As shown, a remote IPF module 134 or charging component 214 may be in communication with a flow control server 106 over the Internet 104 or another networking fabric or combination of networking fabrics. In various embodiments, a protocol specifying an order of messages and/or a format for messages may be used to govern the communications between the remote IPF module 134 or charging component 214 and flow control server 106.

In some embodiments, the protocol may include two channels, one for messages initiated by the remote IPF module 134 or charging component 214 and for replies to those messages from the flow control server 106, and another channel for message initiated by the flow control server 106 and for replies to those messages from the remote IPF module 134 or charging component 214. The channels may be asynchronous with respect to each other (that is, initiation of messages on one channel may be entirely independent of initiation of messages on the other channel). However, each channel may itself be synchronous (that is, once a message is sent n a channel, another message may not be sent until a reply to the first message is received).

As shown, the remote IPF module 134 or charging component 214 may initiate communication 902 with the flow control server 106. In some embodiments, communication 902 may be initiated when, for example, an electric resource 112 first plugs in/connects to the power grid 114. In other embodiments, communication 902 may be initiated at another time or times. The initial message 902 governed by the protocol may require, for example, one or more of an electric resource identifier, such as a MAC address, a protocol version used, and/or a resource identifier type.

Upon receipt of the initial message by the flow control server 106, a connection may be established between the remote IPF module 134 or charging component 214 and flow control server 106. Upon establishing a connection, the remote IPF module 134 or charging component 214 may register with flow control server 106 through a subsequent communication 903. Communication 903 may include a location identifier scheme, a latitude, a longitude, a max power value that, the remote IPF module 134 or charging component 214 can draw, a max power value that the remote IPF module 134 or charging component 214 can provide, a current power value, and/or a current state of charge.

After the initial message 902, the protocol may require or allow messages 904 from the flow control server 106 to the remote IPF module 134 or charging component 214 or messages 906 from remote IPF module 134 or charging component 214 to the flow control server 106. The messages 904 may include, for example, one or more of commands, messages, and/or updates. Such messages 904 may be provided at any time after the initial message 902. In one embodiment, messages 904 may include a command setting, a power level and/or a ping to determine whether the remote IPF module 134 or charging component 214 is still connected.

The messages 906 may include, for example, status updates to the information provided in the registration message 903. Such messages 906 may be provided at any time after the initial message 902. In one embodiment, the messages 906 may be provided on a pre-determined time interval basis. In various embodiments, messages 906 may even be sent when the remote IPF module 134 or charging component 214 is connected, but not registered. Such messages 906 may include data that is stored by flow control server 106 for later processing. Also, in some embodiments, messages 904 may be provided in response to a message 902 or 906.

Exemplary Safety and Remote Smart-Islanding

The exemplary power aggregation system 100 can include methods and components for implementing safety standards and safely actuating energy discharge operations. For example, the exemplary power aggregation system 100 may use in-vehicle line sensors as well as smart-islanding equipment installed at particular locations. Thus, the power aggregation system 100 enables safe vehicle-to-grid operations. Additionally, the power aggregation system 100 enables automatic coordination of resources for backup power scenarios.

In one implementation, an electric vehicle 200 containing a remote IPF module 134 or transceiver 212 (with a local charging component 214) stops vehicle-to-grid upload of power if the remote IPF module 134 or charging component 214 senses no line power originating from the grid 114. Ibis halting of power upload prevents electrifying a cord that may be unplugged, or electrifying a powerline 206 that is being repaired, etc. However, this does not preclude using the electric vehicle 200 to provide backup power if grid power is down because the safety measures described below may be used to ensure that an island condition is not created.

Additional smart-islanding equipment installed at a charging location can communicate with the remote IPF module 134 or charging component 214 to coordinate activation of power upload to the grid 114 if grid power drops. One particular implementation of this technology is a vehicle-to-ho me backup power capability.

Also, in a further implementation, electric vehicle 200 may be PHEV (i.e., hybrid vehicle) partially powered by fuel or some other non-electric energy source. In such an implementation, the electric vehicle 200 may be started, subject to safeguards, to provide additional energy to enhance the vehicle-to-home backup power capability.

Figure 10:
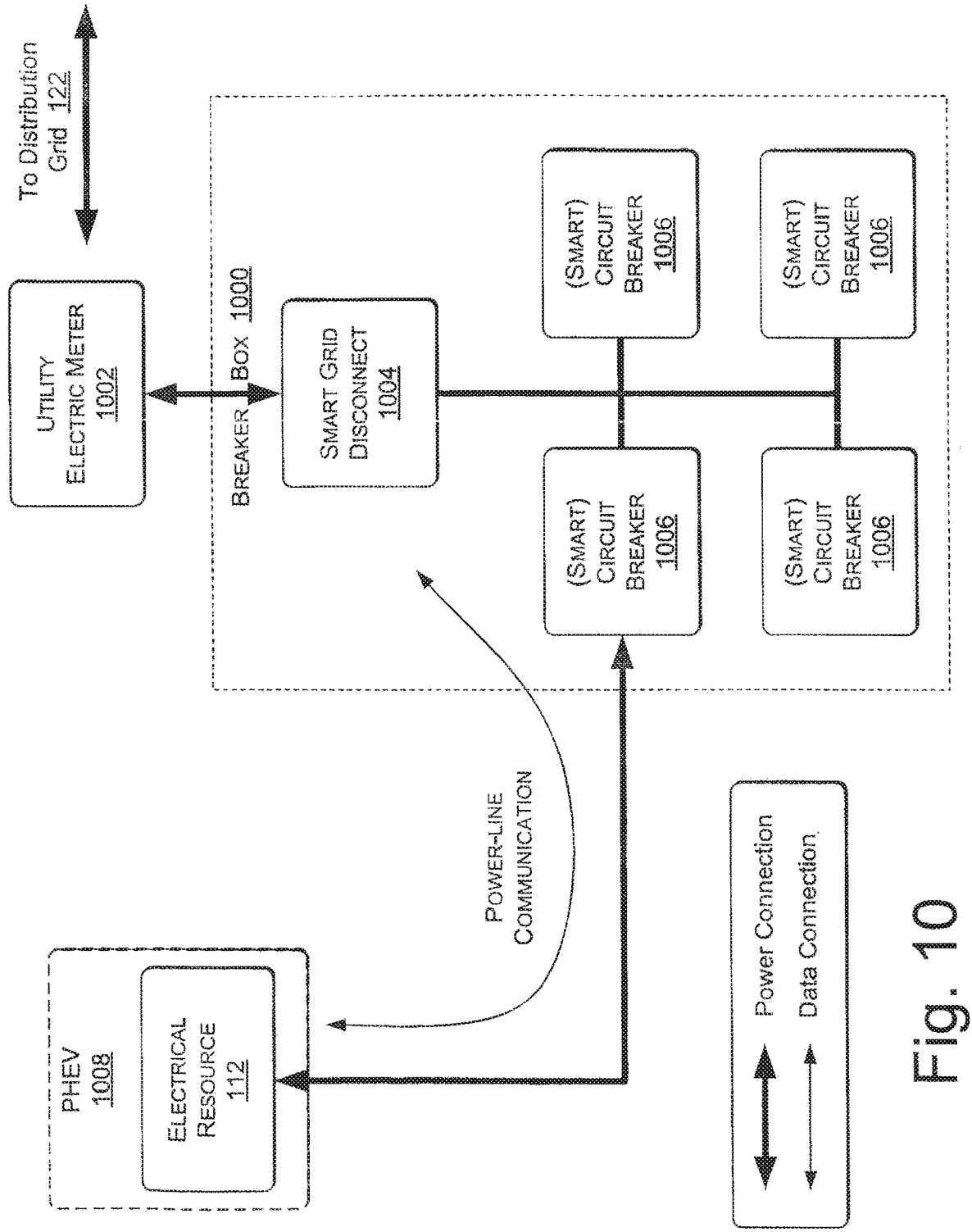
FIG. 10 is diagram of exemplary safety measures in a vehicle-to-home implementation of the power aggregation system.

FIG. 10 shows exemplary safety measures in a vehicle-to-home scenario, in which an electric resource 112, and potentially a PHEV 1008 comprising the electric resource 112, is used to provide power to a load or set of loads (as in a home). A breaker box 1000 is connected to the utility electric meter 1002. When an electric resource 112/PHEV 1008 is flowing power into the grid (or local loads), an islanding condition should be avoided for safety reasons. The electric resource 112 should not energize a line that would conventionally be considered de-energized in a power outage by line workers.

A locally installed smart grid disconnect (switch) 1004 senses the utility line in order to detect a power outage condition and coordinates with the electric resource 112 to enable vehicle-to-home power transfer. In the case of a power outage, the smart grid disconnect 1004 disconnects the circuit breakers 1006 from the utility grid 114 and communicates with the electric resource 112/PHEV 1008 to begin power backup services. When the utility services return to operation, the smart grid disconnect 1004 communicates with the electric resource 112/PHEV 1008 to disable the backup services and reconnect the breakers to the utility grid 114.

In various embodiments, the electric resource 112 may be part of a PHEV 1008. As mentioned above, PHEV 1008 may include not only the electric power source of electric resource 112, but also at least one additional power source, such as a fuel-driven engine. To enhance the backup power provided, the fuel engine and/or other power source of the PHEV 1008 may be started. In some embodiments, the PHEV 1008 may only be manually started by a user in order to reduce the hazards posed by exhaust, and/or other potentially dangerous conditions. In other embodiments, PHEV 1008 may be started automatically. For example, a remote IPF module 134 or charging component 214 may receive an instruction from the switch 1004 to turn on the PHEV 1008 to provide additional power. In such other embodiments, the PHEV 1008 may possess additional safeguards, such as a carbon monoxide sensor, safety interlocks to make sure that PHEV 1008 is in park with the break on, and/or a location awareness to determine whether the current location is safe for running PHEV 1008. Also, automatic starting of PHEV 1008 may be conditioned based on user preferences (such as preferences entered through the exemplary user interfaces discussed above). PHEV 1008 may then only run subject to compliance with the safeguards and/or preferences.

Figure 11:
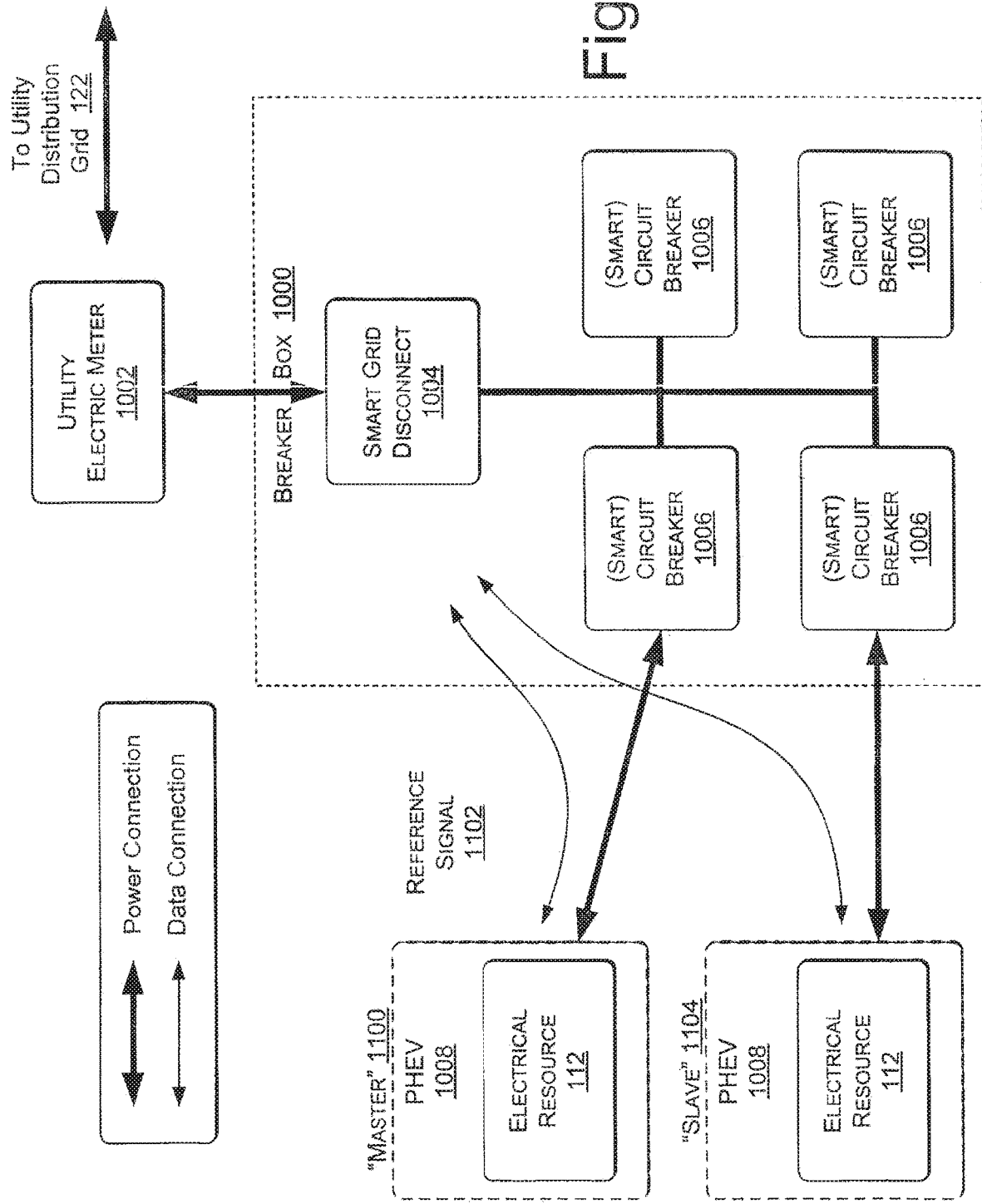
FIG. 11 is a diagram of exemplary safety measures when multiple electric resources flow power to a home in the power aggregation system.

FIG. 11 shows exemplary safety measures when multiple electric resources 112 and potentially PHEVs 1008 comprising the electric resources 112, power a home. In this case, the smart grid disconnect 1004 coordinates with all connected electric resources 112. One electric resource 112 is deemed the "master" 1100 for purposes of generating a reference signal 1102 and the other resources are deemed "slaves" 1104 and follow the reference of the master 1100. In a case in which the master 1100 disappears from the network, the smart grid disconnect 1004 assigns another slave 1104 to be the reference/master 1100.

Figure 12:
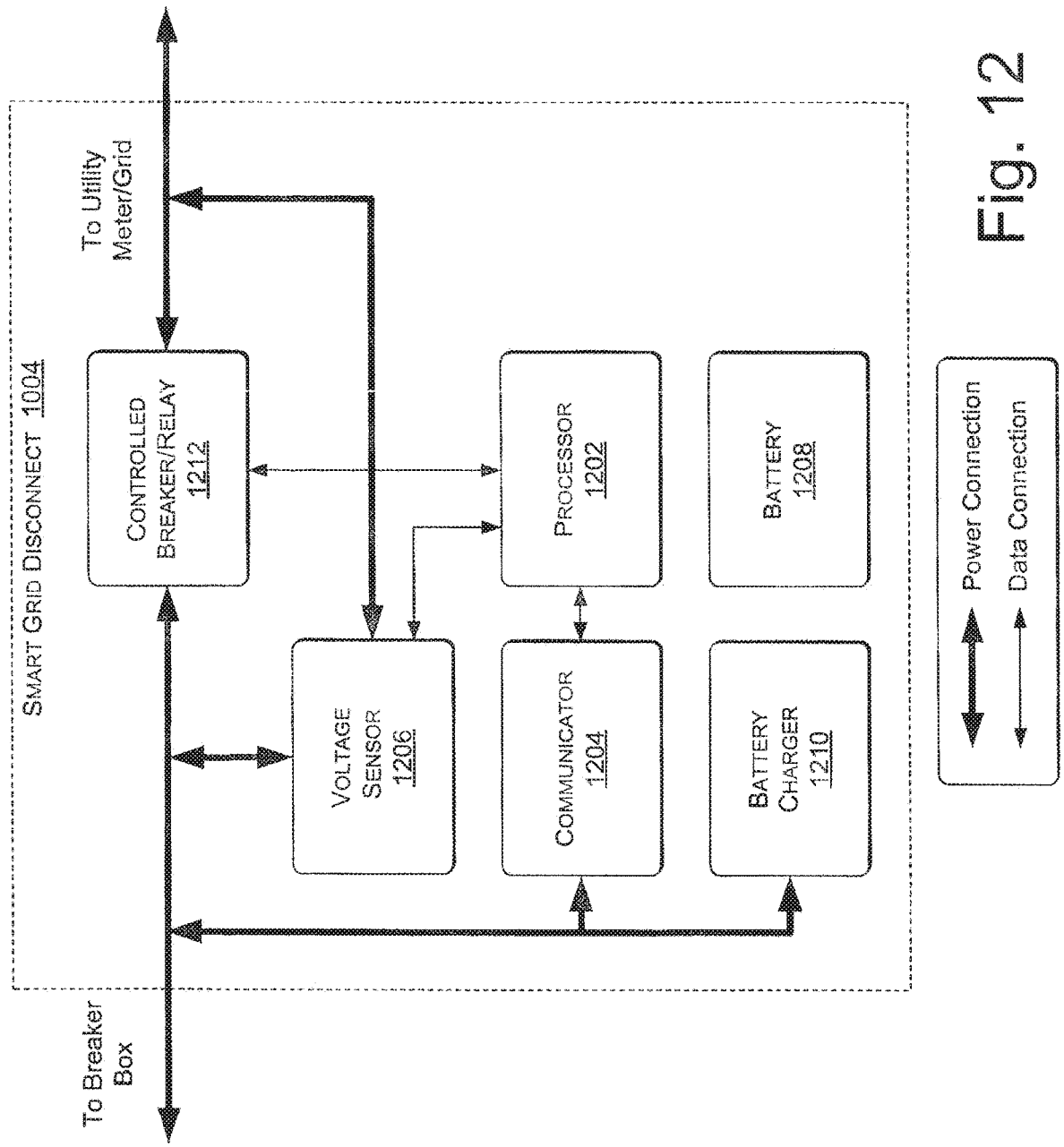
FIG. 12 is a block diagram of an exemplary smart disconnect of the power aggregation system.

FIG. 12 shows the smart grid disconnect 1004 of FIGS. 10 and 11, in greater detail, in one implementation, the smart grid disconnect 1004 includes a processor 1202, a communicator 1204 coupled with connected electric resources 112, a voltages sensor 1206 capable of sensing both the internal and utility-side AC lines, a battery 1208 for operation during power outage conditions, and a battery charger 1210 for maintaining the charge level of the battery 1208. A controlled breaker or relay 1212 switches between grid power and electric resource-provided power when signaled by the processor 1202.

Exemplary Methods

Figure 13:
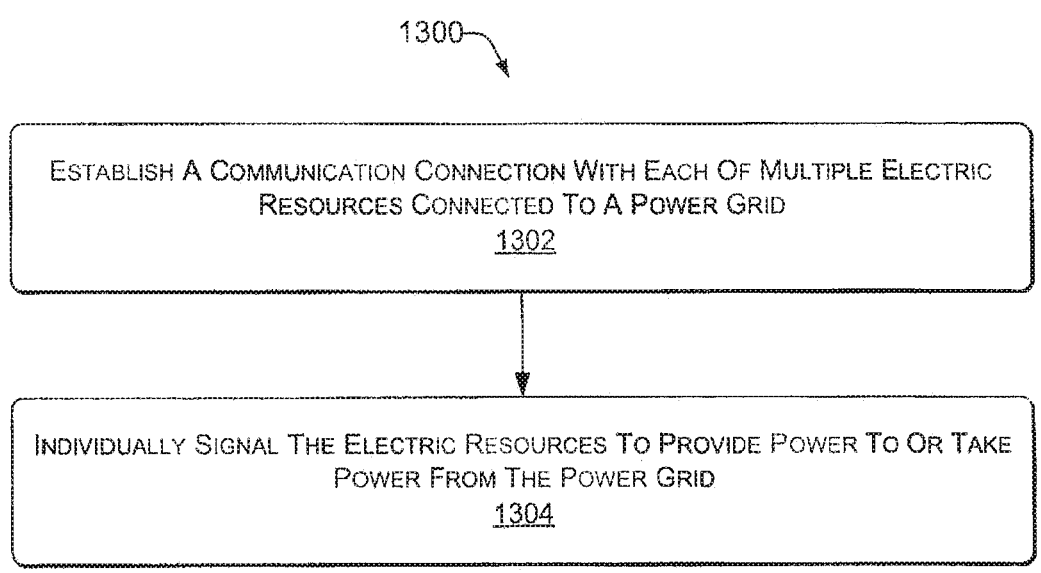
FIG. 13 is a flow diagram of an exemplary method of power aggregation.

FIG. 13 shows an exemplary method 1300 of power aggregation. In the flow diagram, the operations are summarized in individual blocks. The exemplary method 1300 may be performed by hardware, software, or combinations of hardware, software, firmware, etc., for example, by components of the exemplary power aggregation system 100.

At block 1302, communication is established with each of the multiple electric resources connected to a power grid. For example, a central flow control service can manage numerous intermittent connections with mobile electric vehicles, each of which may connect to the power grid at various locations. An in-vehicle remote agent or local charging component 214 and transceiver 212 connect each vehicle to the Internet when the vehicle connects to the power grid.

At block 1304, the electric resources are individually signaled to provide power to or take power from the power grid.

Figure 14:
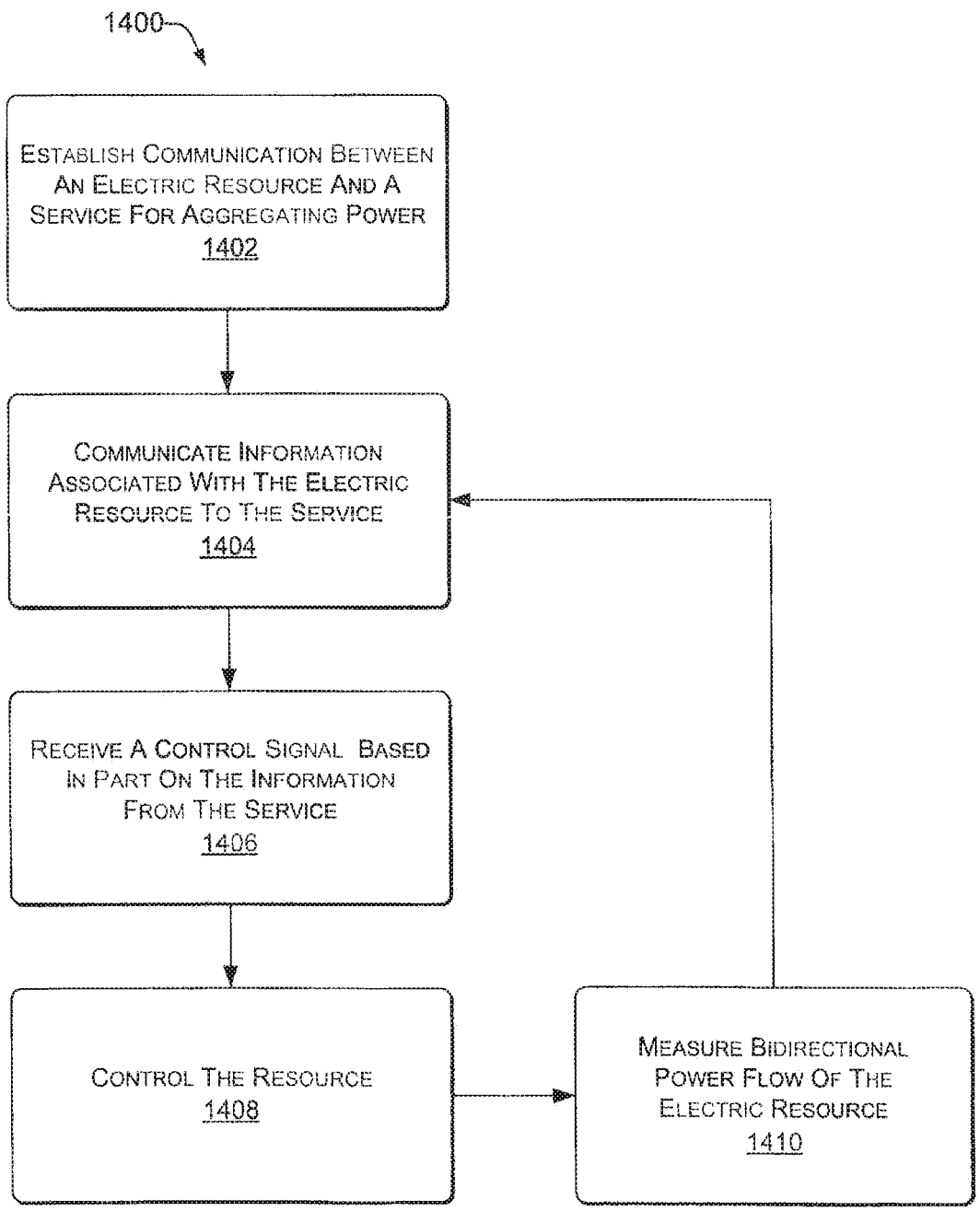
FIG. 14 is a flow diagram of an exemplary method of communicatively controlling an electric resource for power aggregation.

FIG. 14 is a flow diagram of an exemplary method of communicatively controlling an electric resource for power aggregation. In the flow diagram, the operations are summarized in individual blocks. The exemplary method 1400 may be performed by hardware, software, or combinations of hardware, software firmware, etc., for example, by components of the exemplary intelligent power flow (IPF) module 134 or by component of the charging component 214.

At block 1402, communication is established between an electric resource and a service for aggregating power.

At block 1404, information associated with the electric resource is communicated to the service.

At block 1406, a control signal based in part upon the information is received from the service.

At block 1408, the resource is controlled, e.g., to provide power to the power grid At block 1410, bidirectional power flow of the electric device is measured, and used as part of the information associated with the electric resource that is communicated to the service at block 1404.

Figure 15:
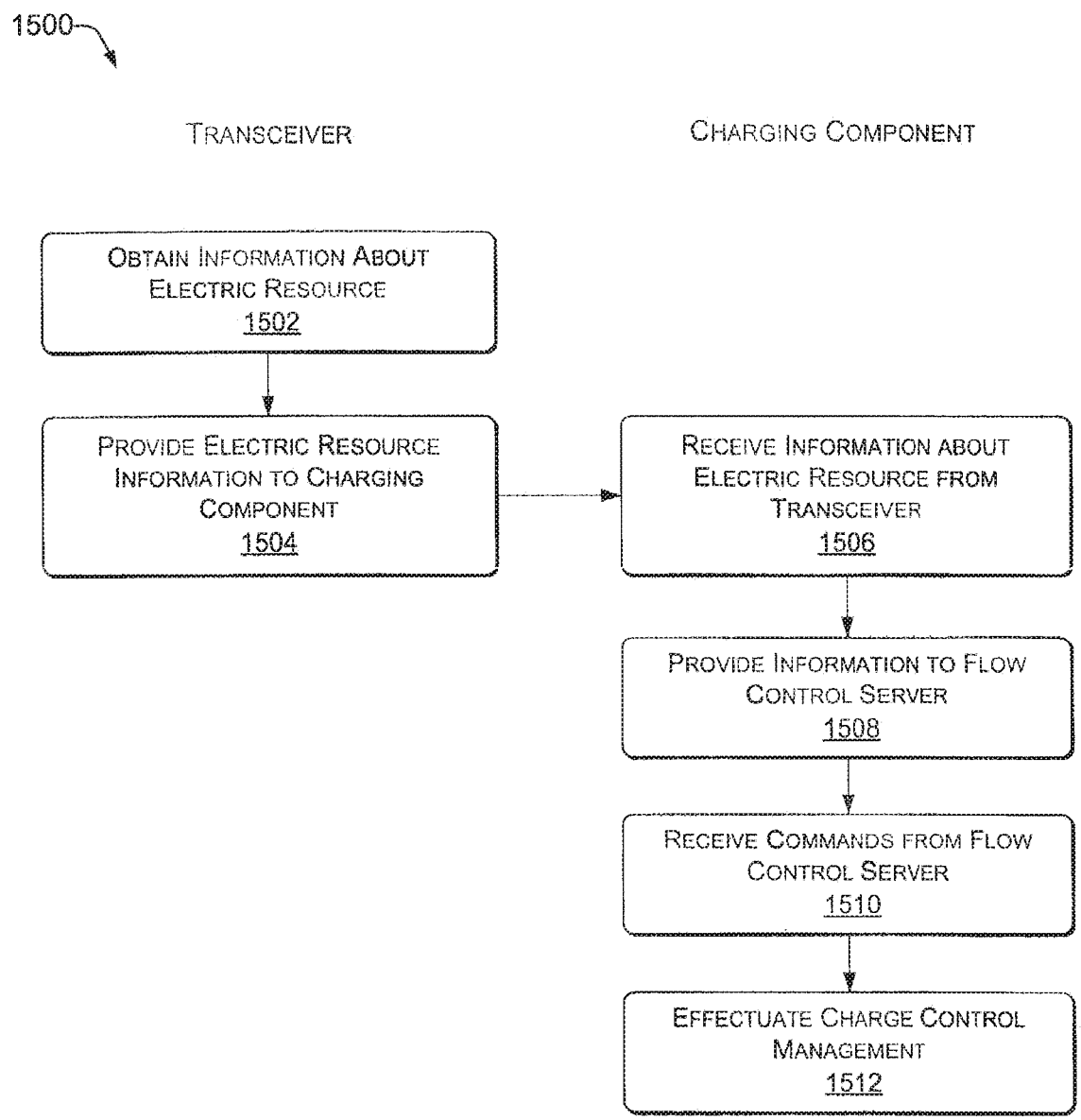
FIG. 15 is a flow diagram of an exemplary method of communication between a transceiver and charge component and charge control management by the charge component.

FIG. 15 is a flow diagram of an exemplary method of communication between a transceiver and charge component and charge control management by the charge component. In the flow diagram, the operations are summarized in individual blocks. The exemplary method 1500 may be performed by hardware, software, or combinations of hardware, software, firmware, etc., for example, by components of the exemplary transceiver 212 and charging component 214.

At block 1502, a transceiver 212 may about information about an electric resource 112 to which the transceiver is coupled through a data point.

At block 1504, the transceiver 212 may provide the obtained electric resource information to a charging component 214, the charging component 214 being communicatively coupled to the transceiver 212 and physically coupled to the electric resource 212 by a charging medium.

At block 1506, the charging component 214 may receive the electric resource information from the transceiver 212.

At block 1508, the charging component 214 may provide the electric resource information to flow control server 106.

At block 1510, the charging component 214 may receive, in response, one or mote commands from the flow control server 106 to cause the charging component 214 to effectuate charge control management.

At block 1512, the charging component 214 may effectuate charge control management by starting or stopping a flow of power between the electric resource 112 and a power grid 114 or by providing the commands to the electric resource 112 through the transceiver 212.

Figure 16:
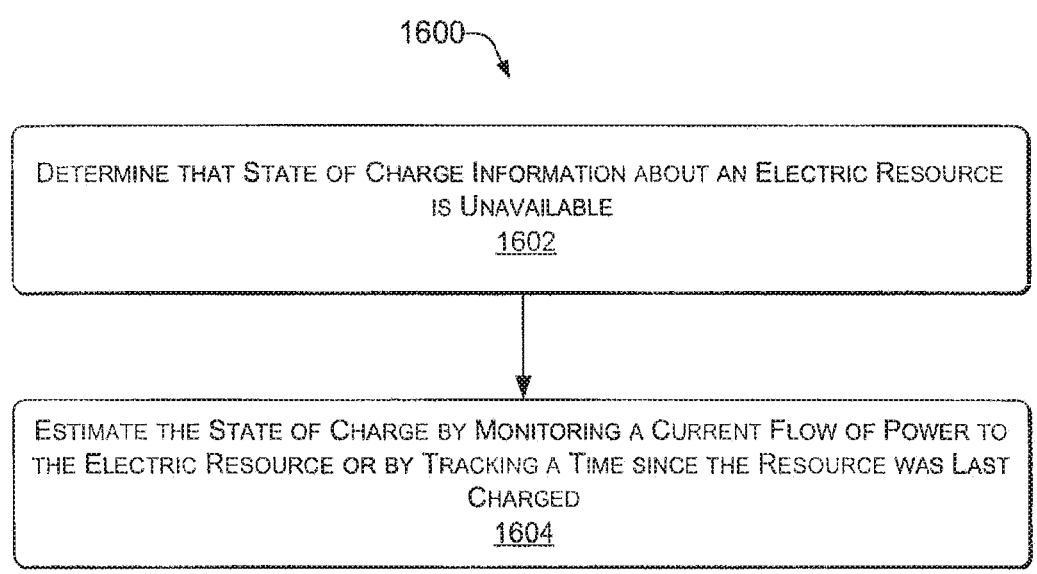
FIG. 16 is a flow diagram of an exemplary method of estimating a state of charge.

FIG. 16 is a flow diagram of an exemplary method of estimating a state of charge. In the flow diagram, the operations are summarized in individual blocks. The exemplary method 1600 may be performed by hardware, software, or combinations of hardware, software, firmware, etc., for example, by components of the exemplary charging component 214.

At block 1602, the charging component 214, remote IPF module 134, or flow control server 106 may determine that current state-of-charge information about an electric resource 112 is unavailable.

At block 1604, the current stale-of-charge may be estimated by monitoring a current flow of power from the grid 114 to the resource 112 or by tracking the time since the resource was last charged.

Figure 17:
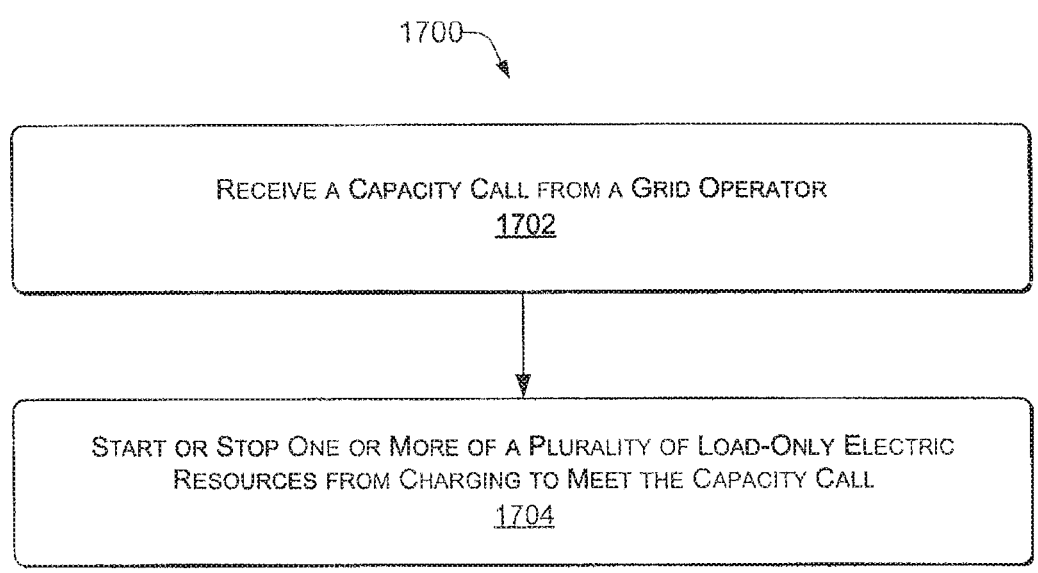
FIG. 17 is a flow diagram of air exemplary method of controlling charging of load-only electric resources.

FIG. 17 is a flow diagram of an exemplary method of controlling charging of load-only electric resources. In the flow diagram, the operations are summarized in individual blocks. The exemplary method 1700 may be performed by hardware, software, or combinations of hardware, software, firmware, etc., for example, by components of the exemplary remote IPF module 134 or charging component 214.

At block 1702, a flow control server 106 may receive a capacity call from a grid operator 116 requesting an up or down regulation to take more or less power from the grid 114.

At block 1704, in response to the call, the flow control server 106 may cause one or more of a plurality of load-only electric vehicles 200 to start or stop charging in order to meet the capacity call.

Figure 18:
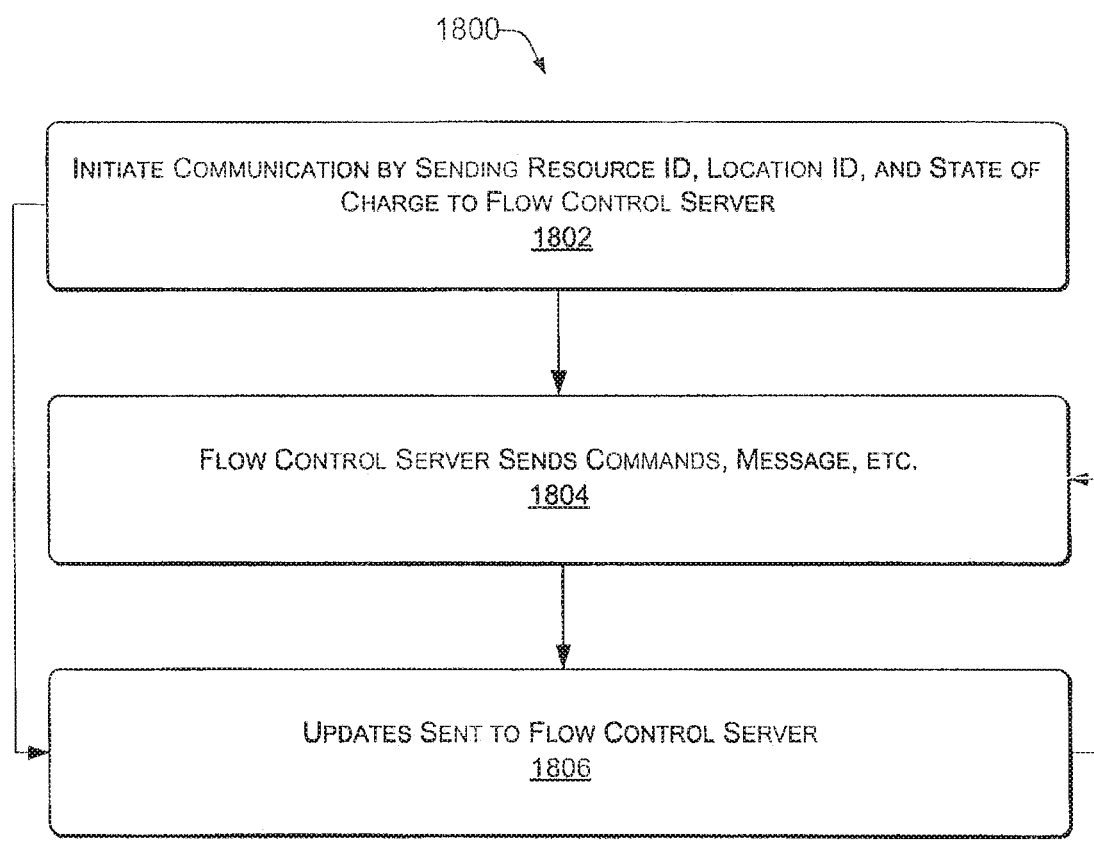
FIG. 18 is a flow diagram of an exemplary method for a resource communication protocol.

FIG. 18 is a flow diagram of an exemplary method for a resource communication protocol. In the flow diagram, the operations are summarized in individual blocks. The exemplary method 1800 may be performed by hardware, software, or combinations of hardware, software, firmware, etc. for example, by components of the exemplary power aggregation system 100.

At block 1802, a remote IPF module 134 or charging component 214 may initiate communication with a flow control server 106 through a message required by a resource communication protocol to include one or more of a resource identifier, a location identifier, anchor a state-of-charge of an electric resource 112.

At block 1804, at any point after communication is initiated, the flow control server 106 may send one or more commands, messages, or updates to the remote IPF module 134 or charging component 214.

At block 1806, at any point after communication is initiated, the remote IPF module 134 or charging component 214 may send updated information to the flow control server 106.

Figure 19:
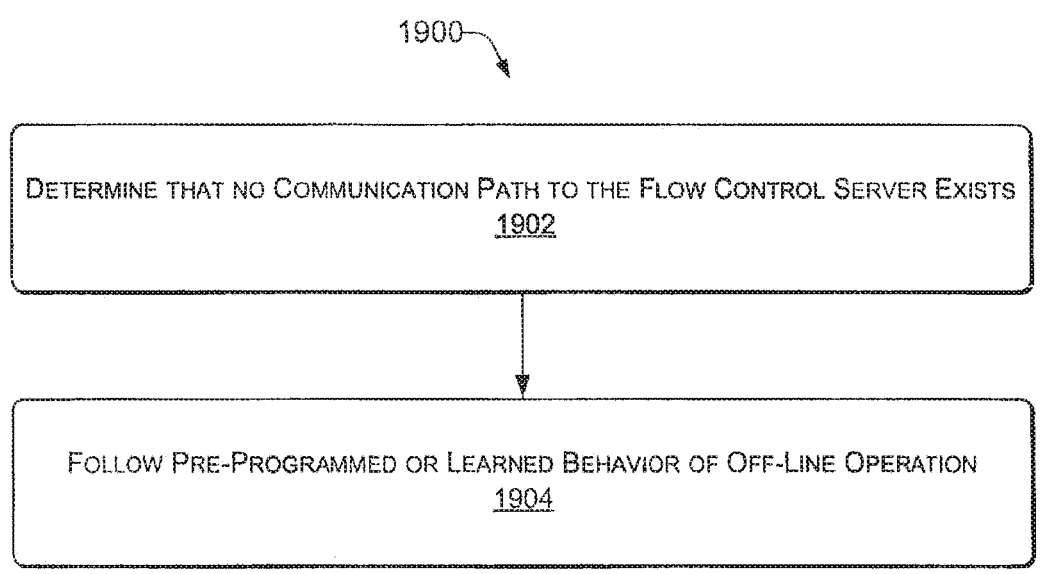
FIG. 19 is a flow diagram of an exemplary method of offline behavior for an electric resource.

FIG. 19 is a flow diagram of an exemplary method of offline behavior for an electric resource. In the flow diagram, the operations are summarized in individual blocks. The exemplary method 1900 may be performed by hardware, software, or combinations of hardware, software, firmware, etc., for example, by components of the exemplary remote IPF module 134 or charging component 214.

At block 1902, a remote IPF module 134 or charging component 214 may determine that no communication path to a flow control server 106 exists.

At block 1904, in response to the determination, the remote IPF module 134 or charging component 214 may follow a pre-programmed or learned behavior of offline operation.

Figure 20:
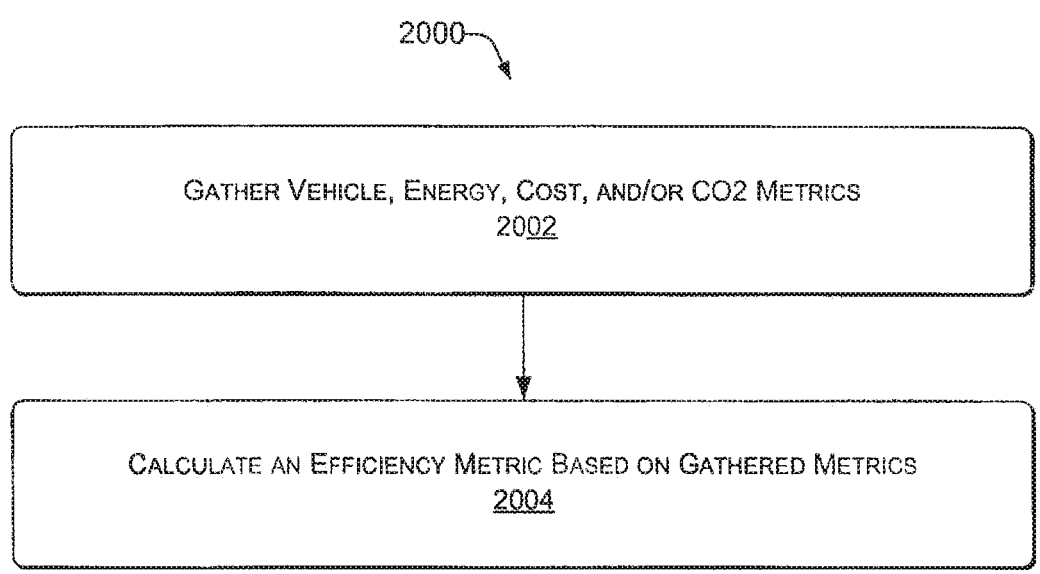
FIG. 20 is a flow diagram of an exemplary method of calculating an efficiency metric for an electric resource.

FIG. 20 is a flow diagram of an exemplary method of calculating an efficiency metric for an electric resource. In the flow diagram, the operations are summarized in individual blocks. The exemplary method 2000 may be performed by hardware, software, or combinations of hardware, software, firmware, etc., for example, by components of the exemplary power aggregation system 100.

At block 2002, a remote IPF module 134, charging component 214, or flow control server 106 may gather vehicle, energy, cost, and $CO_2$ metrics.

At block 2004, one or more efficiency metrics may be calculated based on the gathered metrics.

Figure 21:
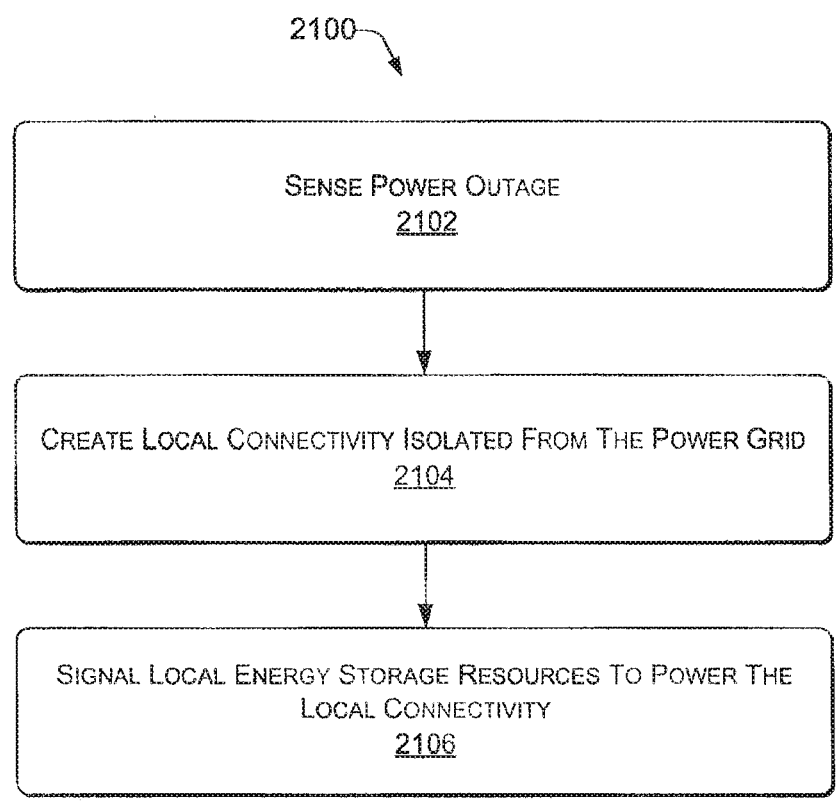
FIG. 21 is a flow diagram of an exemplary method of smart islanding, including a safety mechanism.

FIG. 21 is a flow diagram of an exemplary method of smart islanding. In the flow diagram, the operations are summarized in individual blocks. The exemplary method 2100 may be performed by hardware, software, or combinations of hardware, software, firmware, etc., for example, by components of the exemplary power aggregation system 100.

At block 2102, a power outage is sensed.

At block 2104, a local connectivity—a network isolated from the power grid—is created.

Figure 22:
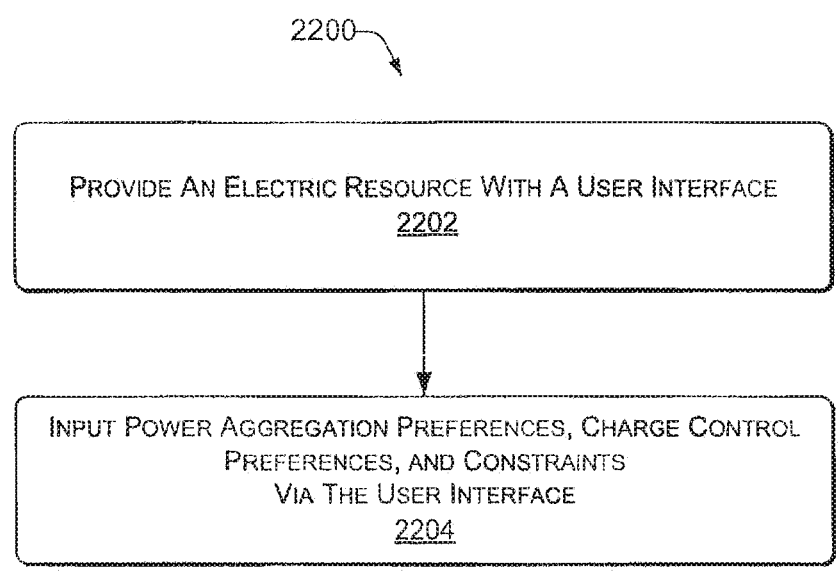
FIG. 22 is a flow diagram of an exemplary method of extending a user interface for power aggregation.

At block 2106, local energy storage resources are signaled to power the local connectivity, FIG. 22 is a flow diagram of an exemplary method of extending a user interface for power aggregation. In the flow diagram, the operations are summarized in individual blocks. The exemplary method 2200 may be performed by hardware, software, or combinations of hardware, software, firmware, etc., for example, by components of the exemplary power aggregation system 100.

At block 2202, a user interface is associated with an electric resource. The user interface may be displayed, in, on, or near an electric resource, such as an electric vehicle that includes an energy storage system or a charging station, or the user interface may be displayed on a device associated with the owner of the electric resource, such as a cell phone or portable computer.

At block 2204, power aggregation preferences, charge control management preferences, and constraints are input via the user interface. In other words, a user may control a degree of participation of the electric resource in a power aggregation scenario via the user interface. Or, the user may control the characteristics of such participation.

Conclusion

Although exemplary systems and methods have been described in language specific to structural features and/or methodological acts, it is to be understood that the subject matter defined in the appended claims is not necessarily limited to the specific features of acts described. Rather, the specific features and acts are disclosed as exemplary forms of implementing the claimed methods, devices, systems, etc.

The invention claimed is:

1. A power aggregation system, comprising:
a flow controller, operable to communicate with one or more electric vehicles intermittently connected to a power grid, each vehicle having its own vehicle constraints, the flow controller comprising:
a connection manager, operable to communicate with the one or more electric vehicles;
a database, operable to store historical data for the one or more electric vehicles, including historical time of connection to the power grid, historical duration of connection to the power grid, historical location of connection to the power grid, and historical state of charge, wherein the historical vehicle data is updated in the database when the one or more electric vehicles connects to the power grid;
a prediction engine, operable to make predictions about the behavior of the one or more electric vehicles using, at least in part, the historical data, wherein the predictions include when the one or more electric vehicles will connect to the power grid, the duration of the connection, the location of the connection, and the state of charge at connect time;
a grid interaction manager operable to receive signals from a power grid operator, associated with the power grid, requesting service to the power grid by the one or more electric vehicles; and
a constraint optimizer, operable to determine the availability of the one or more electric vehicles to participate in the requested service to the power grid based on constraints of the one or more electric vehicles, the constraints including when the one or more electric vehicles will connect to the power grid, the duration of the connection, the location of the connection, and the state of charge at connect time, the constraint optimizer further operable to send control signals, via the connection manager, to the one or more electric vehicles when the constraints of the one or more electric vehicles are satisfied, wherein the control signals provide information indicating to the electric vehicle when to cause power to flow from the electric vehicle to the power grid or when to cause power to flow from the power grid to the electric vehicle.

2. The power aggregation system of claim 1, wherein the flow controller further comprises:
a contract manager, operable to communicate with the energy markets and the grid operator to determine the availability, pricing levels and available services for the one or more electric vehicles, wherein the pricing levels and services are constrains of the one or more electric vehicles, and wherein the constrain optimizer is operable to determine the availability of the one or more electric vehicles to provide the requested service to the power grid based on the pricing levels and available services.

3. The power aggregation system of claim 2, wherein the constraints include the price sensitivity of the owner of the one or more electrical vehicles, and wherein the constraint optimizer uses the price of energy to determine whether owner accepts participation in the requested service based on the price sensitivity of the owner and the price of energy.

4. The power aggregation system of claim 1, wherein the prediction engine is operable to predict the behavior of the power grid.

5. The power aggregation system of claim 1, further comprising:
a charging component communicatively coupled to the flow controller, the charging component receiving signals from the flow controller to control the charging or discharging of the one or more electric vehicles connected to the charging component, wherein the charging component is further operable to send information indicating connection time, connection duration, and state of charge to the flow controller when the one or more electric vehicles are connected to the charging component.

6. The power aggregation system of claim 1, further comprising:
a plurality of the flow controllers, each flow controller associated with a control area and a power grid operator associated with the control area; and
a directory server, operable to communicate with and inform the one or more electric vehicles which flow controller to communicate with.

7. The power aggregation system of claim 6, wherein the directory server is integrated with one of the plurality of flow controllers, and wherein the directory server is operable to interact with the one or more electric vehicles or forward communication of the one or more electric vehicles to another flow controller based on the location of the one or more electric vehicles.

8. The power aggregation system of claim 6, where in the directory server includes a publically accessible database that maps control areas to one or more of the plurality of flow control centers and is used to signal the one or more electric vehicles which flow control server to communicate with.

9. The power aggregation system of claim 1, wherein the grid interaction manager is operable to send a signal to the power grid operator that the one or more electric vehicle are available to service the power grid associated with the power grid operator within the constraints of the one or more electric vehicles.

10. The power aggregation system of claim 1, wherein the grid interaction manager is operable to send a signal to the power grid operator indicating availability of the one or more electric vehicle at various points of time in the future.

11. The power aggregation system of claim 1, wherein the constraints of the one or more electric vehicles include one or more of:
price sensitivity of the owner;
owner sensitivity to revenue relative to state of charge;
manual charging overrides; and
owner preferences.

12. The power aggregation system of claim 1, wherein the connection manager notifies the owner of the one or more electric vehicles if the electric vehicle associated with the owner remains disconnected for a predetermined amount of time.

13. The power aggregation system of claim 1, wherein the prediction engine is operable to build at least one parameterized model used to predict the behavior of the one or more electric vehicles.

14. The power aggregation system of claim 1, wherein the prediction engine is operable to build a plurality of parameterized models used to predict the behavior of associated sets of a plurality of the one or more electric vehicles.

15. The power aggregation system of claim 1, wherein the prediction engine is operable to build a separate parameterized model corresponding to each of the one or more electric vehicles, wherein each separate parameterized model predicts the behavior of the corresponding one electric vehicle.

16. The power aggregation system of claim 15, wherein the charging component charges the one or more electric vehicles according to a standard charging mode when there is no communication with the flow controller.

17. The power aggregation system of claim 16, wherein the standard charging mode includes preprogrammed instructions.

18. The power aggregation system of claim 17, wherein the standard charging mode includes instructions to charge the one or more electric vehicle when the time of use rates are low.

19. The power aggregation system of claim 16, wherein the standard charging mode includes learned behavior of the one or more electric vehicles.

20. The power aggregation system of claim 16, wherein transaction information of an instance where an electric vehicle is connected to a charging component is cached and transmitted to the flow controller when communication is reestablished.

* * * * *